US012265825B2

(12) United States Patent
Liu

(10) Patent No.: US 12,265,825 B2
(45) Date of Patent: Apr. 1, 2025

(54) METHOD AND APPARATUS FOR GENERATING CONTROL INSTRUCTION

(71) Applicant: SUZHOU TOUCHAIR TECHNOLOGY CO., LTD, Jiangsu (CN)

(72) Inventor: Guangsong Liu, Jiangsu (CN)

(73) Assignee: SUZHOU TOUCHAIR TECHNOLOGY CO., LTD, Suzhou (CN)

( * ) Notice: Subject to any disclaimer, the term of this patent is extended or adjusted under 35 U.S.C. 154(b) by 76 days.

(21) Appl. No.: 18/139,909

(22) Filed: Apr. 26, 2023

(65) Prior Publication Data

US 2023/0333850 A1    Oct. 19, 2023

Related U.S. Application Data

(63) Continuation of application No. PCT/CN2020/137438, filed on Dec. 18, 2020.

(30) Foreign Application Priority Data

Oct. 26, 2020  (CN) .......................... 202011155758.4

(51) Int. Cl.
    *G06F 3/01*     (2006.01)
    *G06F 1/16*     (2006.01)
    (Continued)

(52) U.S. Cl.
    CPC .......... *G06F 9/30076* (2013.01); *G06F 1/163* (2013.01)

(58) Field of Classification Search
    None
    See application file for complete search history.

(56) References Cited

U.S. PATENT DOCUMENTS

| 10,911,885 | B1 * | 2/2021 | Chemistruck | ........... H04S 7/303 |
| 2017/0188168 | A1 * | 6/2017 | Lyren | ...................... H04S 7/302 |

(Continued)

FOREIGN PATENT DOCUMENTS

| CN | 101201399 A | 6/2008 |
| CN | 101776982 A | 7/2010 |

(Continued)

OTHER PUBLICATIONS

Xu et al., "DMove: Directional Motion-based Interaction for Augmented Reality Head-Mounted Displays", 2019 (Year: 2019).*

(Continued)

*Primary Examiner* — Hyun Nam

(57) ABSTRACT

The present application provides a method and apparatus for generating a control instruction. The method includes: generating a control instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and transmitting the control instruction to the intelligent device, so that the intelligent device executes the control instruction. The present application can conveniently generate the control instruction without requiring the user to perform a trigger operation on a display interface, and provides a virtual interactive control mode.

25 Claims, 32 Drawing Sheets

(51) Int. Cl.
*G06F 3/16* (2006.01)
*G06F 9/30* (2018.01)

(56) References Cited

U.S. PATENT DOCUMENTS

| | | | | |
|---|---|---|---|---|
| 2017/0363262 A1* | 12/2017 | Chien | ................ | F21V 21/0925 |
| 2018/0249075 A1* | 8/2018 | Sheng | ................... | H04N 23/63 |
| 2020/0147471 A1* | 5/2020 | Saint-Louis | ....... | G09B 19/0038 |
| 2020/0260209 A1* | 8/2020 | Yadegari | ................ | H04S 7/304 |
| 2021/0058758 A1* | 2/2021 | Carter | .................. | G06F 1/1698 |
| 2021/0271879 A1* | 9/2021 | Brown | ................ | G06V 40/172 |
| 2024/0398330 A1* | 12/2024 | Balberg | .............. | A61B 5/6822 |

FOREIGN PATENT DOCUMENTS

| | | |
|---|---|---|
| CN | 106937143 A | 7/2017 |
| CN | 109239667 A | 1/2019 |

OTHER PUBLICATIONS

Parhizkari, "Binaural Hearing—Human Ability of Sound Source Localization", Dec. 2008 (Year: 2008).*
International Search Report of PCT Patent Application No. PCT/CN2020/137438 issued on Jul. 13, 2021.

* cited by examiner

101

Enable a first sound detection module to detect a first sound signal transmitted by a second intelligent device and directly reaching the first sound detection module, and enable a second sound detection module to detect a second sound signal transmitted by the second intelligent device and directly reaching the second sound detection module, the first sound signal and the second sound signal being simultaneously transmitted by the second intelligent device

102

Determine a time difference between a receiving time of the first sound signal and a receiving time of the second sound signal

103

Determine a relative angle between the first intelligent device and the second intelligent device based on a distance between the first sound detection module and the second sound detection module and the time difference

Generate a song switching instruction in a case that it is determined that a relative angle between a wearable device worn by a user and an intelligent device changes, the relative angle being determined based on respective detection operations performed by a first sound detection module and a second sound detection module contained in the wearable device aiming at sound signals transmitted by the intelligent device

1202

Transmit the song switching instruction to the intelligent device, so that the intelligent device executes a song switching operation in response to the song switching instruction

Generate a view angle change instruction in a case that it is determined that a relative angle between a wearable device worn by a user and an intelligent device changes, the relative angle being determined based on respective detection operations performed by a first sound detection module and a second sound detection module contained in the wearable device aiming at sound signals transmitted by the intelligent device

2802

Transmit the view angle change instruction to the intelligent device, so that the intelligent device adjusts a view angle of a panoramic image showing a house in a display interface of the intelligent device based on the view angle change instruction

FIG. 28

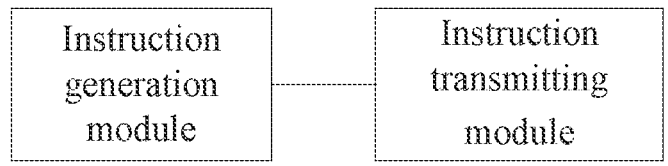

FIG. 32

Generate a view angle change instruction in a case that it is determined that a relative angle between an intelligent device and a wearable device worn by a user changes, the relative angle being determined based on respective detection operations performed by a first sound detection module and a second sound detection module contained in the intelligent device aiming at sound signals transmitted by the wearable device

3301

3302

Adjust a view angle of a panoramic image showing a house in a display interface of the intelligent device based on the view angle change instruction

METHOD AND APPARATUS FOR GENERATING CONTROL INSTRUCTION

CROSS REFERENCE TO RELATED APPLICATIONS

The present application is a Continuation Application of PCT Application No. PCT/CN2020/137438 filed on Dec. 18, 2020, which claims the benefit of Chinese Patent Application No. 202011155758.4 filed on Oct. 26, 2020. All the above are hereby incorporated by reference in their entirety.

TECHNICAL FIELD

The embodiments of the present application relate to the field of information device technology, in particular to a method and apparatus for generating a control instruction.

BACKGROUND

The process of human-computer interaction is actually an input and output process, in which people input instructions to the computer by various means, and the computer processes and presents the output result to the user. The forms of input and output between the human and the computer are diverse, so the forms of interaction are also diverse.

At present, the forms of interaction generally include: (1) Q&A dialogue data input interaction; (2) menu selection data input interaction; (3) form-filling data input interaction; (4) direct operation data input interaction; (5) keyword data input interaction; (6) barcode data input; (7) Optical Character Recognition (OCR); (8) sound data input interaction; (9) image data input interaction. However, these forms of interaction typically rely on the trigger operation of the user on the display interface.

SUMMARY

The embodiments of the present application provide a method and apparatus for generating a control instruction.

The embodiments of the present application adopt the following technical solutions:

A method for generating a control instruction, including: generating a control instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and transmitting the control instruction to the intelligent device, so that the intelligent device executes the control instruction.

In an embodiment, the wearable device is a head wearable device adapted to be worn on the head, and the head wearable device includes an intelligent earphone or intelligent glasses.

In an embodiment, the control instruction includes at least one of an instruction for switching a picture, an instruction for switching an article, an instruction for switching a video, an instruction for switching an audio, an instruction for switching an email, an instruction for switching a view angle, and an instruction for switching an interface.

An apparatus for generating a control instruction, including: a generation module configured to generate a control instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and a transmitting module configured to transmit the control instruction to the intelligent device, so that the intelligent device executes the control instruction.

A method for generating a control instruction, including: generating a control instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and executing an operation corresponding to the control instruction in the intelligent device in response to the control instruction.

In an embodiment, the wearable device is a head wearable device adapted to be worn on the head, and the head wearable device includes an intelligent earphone or intelligent glasses.

In an embodiment, the control instruction includes at least one of an instruction for switching a picture, an instruction for switching an article, an instruction for switching a video, an instruction for switching an audio, an instruction for switching an email, an instruction for switching a view angle, and an instruction for switching an interface.

An apparatus for generating a control instruction, including: a generation module configured to generate a control instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and an execution module configured to execute an operation corresponding to the control instruction in the intelligent device in response to the control instruction.

A method for switching a song, including: generating a song switching instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and transmitting the song switching instruction to the intelligent device, so that the intelligent device executes a song switching operation in response to the song switching instruction.

An apparatus for switching a song, including: an instruction generation module configured to generate a song switching instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and an instruction transmitting module configured to transmit the song switching instruction to the intelligent device, so that the intelligent device executes a song switching operation in response to the song switching instruction.

A wearable device, including: a first sound detection module; a second sound detection module; a control module configured to generate a song switching instruction in a case that it is determined that a relative angle between the wearable device worn by a user and an intelligent device changes, wherein the relative angle is determined based on respective detection operations performed by the first sound detection module and the second sound detection module contained in the wearable device aiming at sound signals transmitted by the intelligent device; and a communication module configured to transmit the song switching instruction to the intelligent device, so that the intelligent device executes a song switching operation in response to the song switching instruction.

A method for switching a song, including: generating a song switching instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and executing a song switching operation in the intelligent device in response to the song switching instruction.

An apparatus for switching a song, including: an instruction generation module configured to generate a song switching instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and a song switching module configured to execute a song switching operation in the intelligent device in response to the song switching instruction.

An intelligent device, including: a first sound detection module; a second sound detection module; a control module configured to generate a song switching instruction in a case that it is determined that a relative angle between the intelligent device and a wearable device worn by a user changes, wherein the relative angle is determined based on respective detection operations performed by a first sound detection module and a second sound detection module contained in the intelligent device aiming at sound signals transmitted by the wearable device; and a song switching module configured to execute a song switching operation in the intelligent device in response to the song switching instruction.

A method for virtually viewing a house, including: generating a view angle change instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and transmitting the view angle change instruction to the intelligent device, so that the intelligent device adjusts a view angle of a panoramic image showing a house in a display interface of the intelligent device based on the view angle change instruction.

An apparatus for virtually viewing a house, including: an instruction generation module configured to generate a view angle change instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and an instruction transmitting module configured to transmit the view angle change instruction to the intelligent device, so that the intelligent device adjusts a view angle of a panoramic image showing a house in a display interface of the intelligent device based on the view angle change instruction.

A wearable device, including: a first sound detection module; a second sound detection module; a control module configured to generate a view angle change instruction in a case that it is determined that a relative angle between a wearable device and an intelligent device changes, wherein the relative angle is determined based on respective detection operations performed by the first sound detection module and the second sound detection module aiming at sound signals transmitted by the intelligent device; and a communication module configured to transmit the view angle change instruction to the intelligent device, so that the intelligent device adjusts a view angle of a panoramic image showing a house in a display interface of the intelligent device based on the view angle change instruction.

A method for virtually viewing a house, including: generating a view angle change instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and adjusting a view angle of a panoramic image showing a house in a display interface of the intelligent device based on the view angle change instruction.

An apparatus for virtually viewing a house, including: an instruction generation module configured to generate a view angle change instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and a view angle adjustment module configured to adjust a view angle of a panoramic image showing a house in a display interface of the intelligent device based on the view angle change instruction.

An intelligent device, including: a first sound detection module; a second sound detection module; a control module configured to generate a view angle change instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and a view angle adjustment module configured to adjust a view angle of a panoramic image showing a house in a display interface of the intelligent device based on the view angle change instruction.

A computer-readable storage medium, wherein a computer-readable instruction is stored in the computer-readable storage medium, and the computer-readable instruction is used for executing the method for generating a control instruction, the method for switching a song, or the method for virtually viewing a house.

From the above technical solutions, it can be seen that the present application can conveniently generate the control instruction without requiring the user to perform a trigger operation on the display interface, and provides a virtual interactive control mode.

DESCRIPTION OF THE DRAWINGS

FIG. 1 illustrates a flowchart of an exemplary method for determining a relative angle between intelligent devices according to the present application.

FIG. 12 illustrates a flowchart of a first exemplary method for switching a song according to the present application.

FIG. 28 illustrates a flowchart of a first exemplary method for virtually viewing a house according to the present application.

FIG. 32 illustrates a structural diagram of a first exemplary apparatus for virtually viewing a house according to the present application.

FIG. 33 illustrates a flowchart of a second exemplary method for virtually viewing a house according to the present application.

DESCRIPTION OF THE EMBODIMENTS

Figure 2:
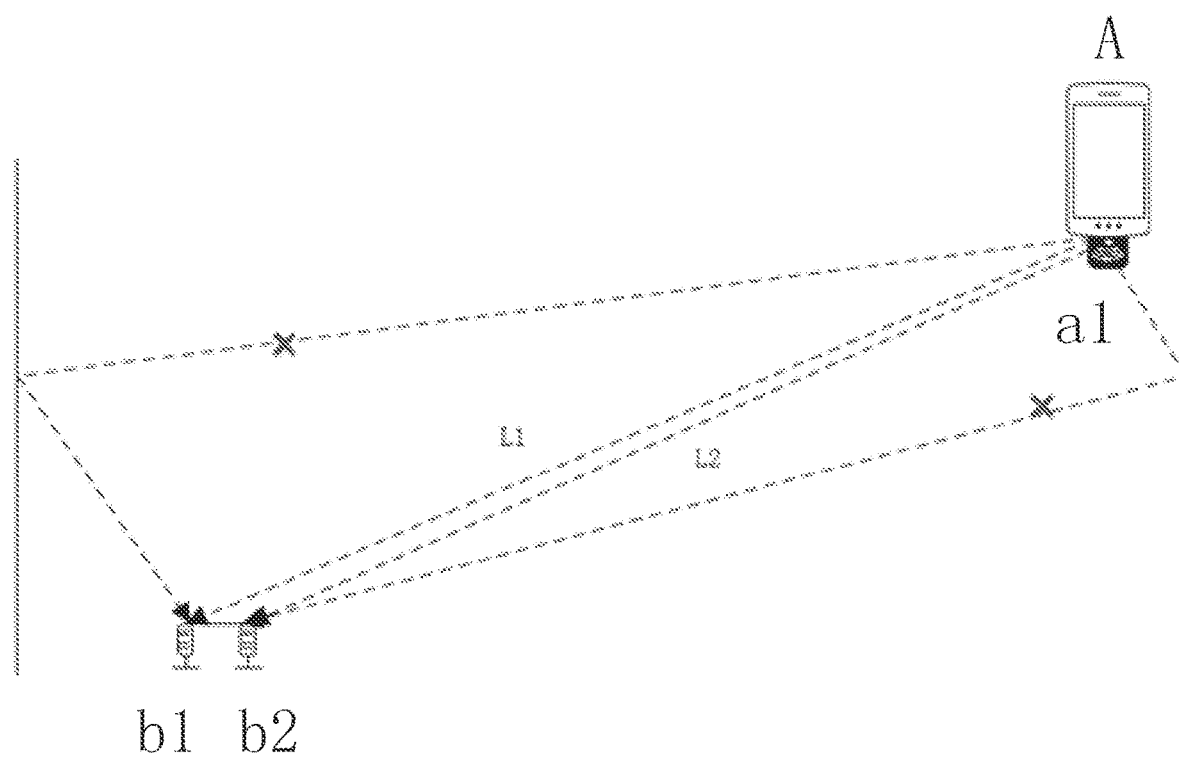
FIG. 2 illustrates a schematic diagram of a principle of determining a relative angle between intelligent devices according to the present application.

In order to clarify the purposes, technical solutions, and advantages of the present application, the present application will be further described in detail below in conjunction with the drawings.

In order to realize the relative positioning between intelligent devices by using software without additional hardware, so that the relative positioning is universal, devices from different manufacturers can achieve interoperability and compatibility, and innovative applications of intelligent devices are explored based on this, an embodiment of the present application provides a solution for recognizing a relative direction between intelligent devices based on sound (exemplarily ultrasound), which does not require additional hardware, can realize recognition of a relative direction between two intelligent devices by using software, and can achieve accurate and reliable positioning results.

Firstly, an intelligent device refers to any device, apparatus or machine with computing and processing capabilities. FIG. 1 illustrates a flowchart of an exemplary method for determining a relative angle between intelligent devices according to the present application. The method is applicable to a first intelligent device. The first intelligent device includes a first sound detection module and a second sound detection module. The first sound detection module and the second sound detection module are fixedly mounted in the first intelligent device. For example, the first sound detection module may be implemented as a microphone or a microphone array arranged in the first intelligent device. Similarly, the second sound detection module may be implemented as a microphone or a microphone array arranged in the first intelligent device and different from the first sound detection module. Referring to FIG. 1, the method includes the following steps:

In step 101, a first sound detection module is enabled to detect a first sound signal transmitted by a second intelligent device and directly reaching the first sound detection module, and a second sound detection module is enabled to detect a second sound signal transmitted by the second intelligent device and directly reaching the second sound detection module. The first sound signal and the second sound signal are simultaneously transmitted by the second intelligent device.

Here, the second intelligent device may transmit one sound signal or simultaneously transmit a plurality of sound signals. For example, in a case that the second intelligent device transmits one sound signal, the first sound detection module and the second sound detection module in the second intelligent device respectively detect the sound signal. A detected signal of the sound signal detected by the first sound detection module and directly reaching the first sound detection module is determined as a first sound signal. A detected signal of the sound signal detected by the second sound detection module and directly reaching the first sound detection module is determined as a second sound signal. For another example, in a case that the second intelligent device simultaneously transmits a plurality of sound signals, such as an ultrasonic signal and an audible sound signal, the first sound detection module in the second intelligent device is adapted to detect the ultrasonic signal, and the second sound detection module is adapted to detect the audible sound signal. The first sound detection module detects the ultrasonic signal, and the second sound detection module detects the audible sound signal. A detected signal of the ultrasonic signal detected by the first sound detection module and directly reaching the first sound detection module is determined as a first sound signal. A detected signal of the audible sound signal detected by the second sound detection module and directly reaching the audible sound signal is determined as a second sound signal. In other words, the first sound signal and the second sound signal may be separate detected signals detected by the first sound detection module and the second sound detection module aiming at the same sound signal transmitted by the second intelligent device. Alternatively, the first sound signal and the second sound signal may be separate detected signals detected by the first sound detection module and the second sound detection module aiming at different sound signals simultaneously transmitted by the second intelligent device.

In step 102, a time difference between a receiving time of the first sound signal and a receiving time of the second sound signal is determined.

Here, the first intelligent device (such as the CPU in the first intelligent device) may record the receiving time of the first sound signal and the receiving time of the second sound signal, and calculate the time difference between them.

In step 103, a relative angle between the first intelligent device and the second intelligent device is determined based on a distance between the first sound detection module and the second sound detection module and the time difference.

For example, step 103 may be executed by the CPU of the first intelligent device. In an embodiment, determining the relative angle between the first intelligent device and the second intelligent device in step 103 includes: determining θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determining the relative angle φ between the first intelligent device and the second intelligent device based on θ, where $$\varphi = \frac{\pi}{2} - \theta.$$

The value of the time difference determined in step 102 may be positive or negative. In a case that the value of the time difference is positive, the receiving time of the second sound signal is earlier than the receiving time of the first sound signal, so the relative angle φ between the first intelligent device and the second intelligent device is usually an acute angle. In a case that the value of the time difference is negative, the receiving time of the first sound signal is earlier than the receiving time of the second sound signal, so the relative angle φ between the first intelligent device and the second intelligent device is usually an obtuse angle.

In the embodiment of the present application, the first sound signal is a signal transmitted by the second intelligent device and directly reaching the first sound detection module, and the second sound signal is a signal transmitted by the second intelligent device and directly reaching the second sound detection module. In fact, both the first sound detection module and the second sound detection module may receive non-directly reaching signals transmitted by the second intelligent device (for example, after reflected by obstacles for a single time or a plurality of times). Therefore, how to determine the directly reading signal from a plurality of received signals has significant significance.

As found by the applicant, in general, a signal stream received by each sound detection module includes a direct channel and a reflection channel. The direct channel can be determined simply and conveniently based on the following principle: among all signals detected by the sound detection module, the signal intensity of the direct channel is generally the strongest.

Therefore, in an embodiment, the method further includes: determining a sound signal with an intensity more than a predetermined threshold within a predetermined time window in a sound signal stream transmitted by the second intelligent device and received by the first sound detection module as the first sound signal; and determining a sound signal with an intensity more than a predetermined threshold within a predetermined time window in a sound signal stream transmitted by the second intelligent device and received by the second sound detection module as the second sound signal.

Figure 4:
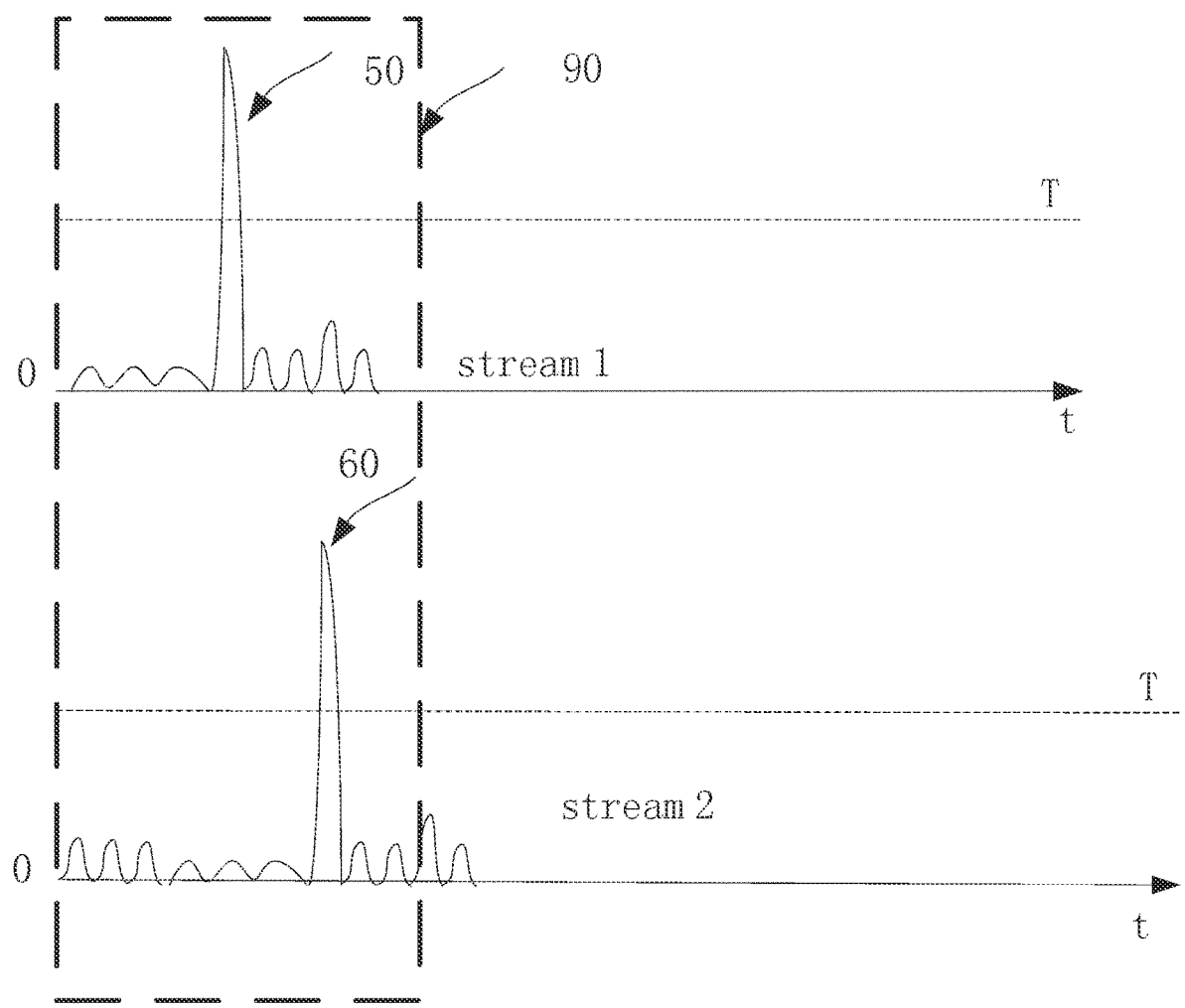
FIG. 4 illustrates a first exemplary schematic diagram of determining a pair of directly reaching signals according to the present application.

FIG. 4 illustrates a first exemplary schematic diagram of determining a pair of directly reaching signals according to the present application. In FIG. 4, the sound signal stream detected by the first sound detection module is stream1. Stream1 includes a plurality of pulse signals that vary along time (t). A threshold of predetermined signal intensity is T. It can be seen that within the time window of 90, the signal intensity of pulse signal 50 in stream1 is more than the threshold T. The sound signal stream detected by the second sound detection module is stream2. Stream2 includes a plurality of pulse signals that vary along time (t). A threshold of predetermined signal intensity is also T. It can be seen that within the time window of 90, the signal intensity of pulse signal 60 in stream2 is more than the threshold T. Therefore, it is determined that pulse signal 50 is the first sound signal and pulse signal 60 is the second sound signal.

In addition, as also found by the applicant, the following two principles may be comprehensively considered to accurately determine the direct channel: (1) among all signals detected by the sound detection module, the signal intensity of the direct channel is generally the strongest; (2) joint discrimination method: the distance difference d converted from the arrival time difference between two direct channel signals (the first sound signal and the second sound signal) should not be greater than the distance between the first sound detection module and the second sound detection module. Therefore, in an embodiment, the method further includes: determining sound signals with an intensity more than a predetermined threshold in the sound signal stream transmitted by the second intelligent device and detected by the first sound detection module to form a first candidate signal set; determining sound signals with an intensity more than a predetermined threshold in the sound signal stream transmitted by the second intelligent device and detected by the second sound detection module to form a second candidate signal set; determining a time difference between a receiving time of each sound signal in the first candidate signal set and a receiving time of each sound signal in the second candidate signal set; determining a pair of sound signals with a time difference less than M as the first sound signal and the second sound signal, where M=(D/c), D is the distance between the first sound detection module and the second sound detection module, and c is the propagation speed of sound.

Figure 5:
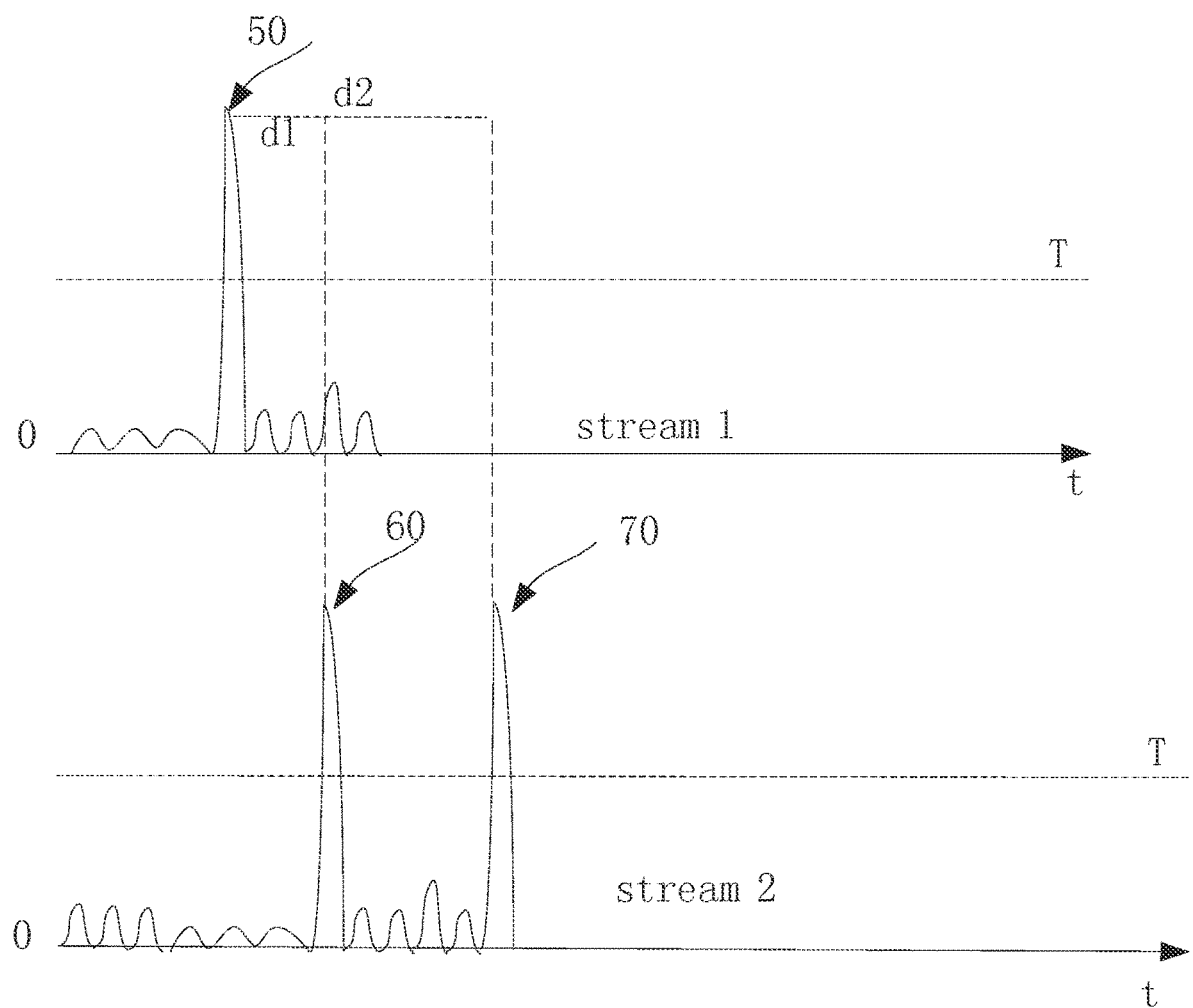
FIG. 5 illustrates a second exemplary schematic diagram of determining a pair of directly reaching signals according to the present application.

FIG. 5 illustrates a second exemplary schematic diagram of determining a pair of directly reaching signals according to the present application. In FIG. 5, the sound signal stream detected by the first sound detection module is stream1. Stream1 includes a plurality of pulse signals that vary along time (t). A threshold of predetermined signal intensity is T. It can be seen that in stream1, the signal intensity of pulse signal 50 is greater than the threshold T, so the first candidate signal set includes pulse signal 50. The sound signal stream detected by the second sound detection module is stream2. Stream2 includes a plurality of pulse signals that vary along time (t). A threshold of predetermined signal intensity is also T. It can be seen that in stream 2, the signal intensity of both pulse signal 60 and pulse signal 70 is more than the threshold T, so the second candidate signal set includes pulse signal 60 and pulse signal 70. Moreover, a time difference d1 between a receiving time of pulse signal 50 in the first candidate signal set and a receiving time of pulse signal 60 in the second candidate signal set is determined, and a time difference d2 between a receiving time of pulse signal 50 in the first candidate signal set and a receiving time of pulse signal 70 in the second candidate signal set is determined. It is assumed that d1 is less than M and d2 is more than M, where M=(D/c), D is the distance between the first sound detection module and the second sound detection module, and c is the propagation speed of the sound. Therefore, pulse signal 50 in a pair of sound signals related to d1 is determined as the first sound signal, and pulse signal 60 in this pair of sound signals is determined as the second sound signal.

Exemplarily, the first sound signal and the second sound signal are ultrasonic waves in Code Division Multiple Access (CDMA) format and contain a Media Access Control (MAC) address (MAC) of the second intelligent device.

Therefore, the first intelligent device can accurately recognize the source of the sound signal based on the MAC address of the second intelligent device contained in the sound signal. In a case that there are a plurality of sound sources transmitting sound signals in the environment, the first intelligent device can accurately determine the relative angle with a sound source by extracting the MAC address from the sound signal and using two directly reaching signals from the same sound source, without being interfered by other sound sources. An embodiment of the present application further provides a method for determining a relative angle between intelligent devices. The method is applicable to a first intelligent device. The first intelligent device includes a first sound detection module and a second sound detection module. The method includes: determining a first time that an ultrasonic signal transmitted by a second intelligent device directly reaches the first sound detection module; determining a second time that an ultrasonic signal directly reaches the second sound detection module; determining a time difference between the first time and the second time; and determining a relative angle between the first intelligent device and the second intelligent device based on a distance between the first sound detection module and the second sound detection module and the time difference.

In an embodiment, determining a relative angle between the first intelligent device and the second intelligent device includes: determining θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determining the relative angle φ between the first intelligent device and the second intelligent device based on θ, where $$\varphi = \frac{\pi}{2} - \theta.$$

In an embodiment, the method further includes at least one of the following processes: (1) determining an ultrasonic signal with an intensity more than a predetermined threshold within a predetermined time window in an ultrasonic signal stream transmitted by the second intelligent device and received by the first sound detection module as an ultrasonic signal directly reaching the first sound detection module, and determining a receiving time of the ultrasonic signal directly reaching the first sound detection module as a first time; determining an ultrasonic signal with an intensity more than a predetermined threshold within a predetermined time window in an ultrasonic signal stream transmitted by the second intelligent device and received by the second sound detection module as an ultrasonic signal directly reaching the second sound detection module, and determining a receiving time of the ultrasonic signal directly reaching the second sound detection module as a second time; (2) determining ultrasonic signals with an intensity more than a predetermined threshold in an ultrasonic signal stream transmitted by the second intelligent device and detected by the first sound detection module to form a first candidate signal set; determining ultrasonic signals with an intensity more than a predetermined threshold in an ultrasonic signal stream transmitted by the second intelligent device and detected by the second sound detection module to form a second candidate signal set; determining a time difference between a receiving time of each ultrasonic signal in the first candidate signal set and a receiving time of each ultrasonic signal in the second candidate signal set; determining the receiving times of a pair of ultrasonic signals with a time difference less than M as a first time and a second time, where M=(D/c), D is the distance between the first sound detection module and the second sound detection module, and c is the propagation speed of sound. The principle and calculation process of relative positioning in the present application will be exemplarily described below.

Figure 3:
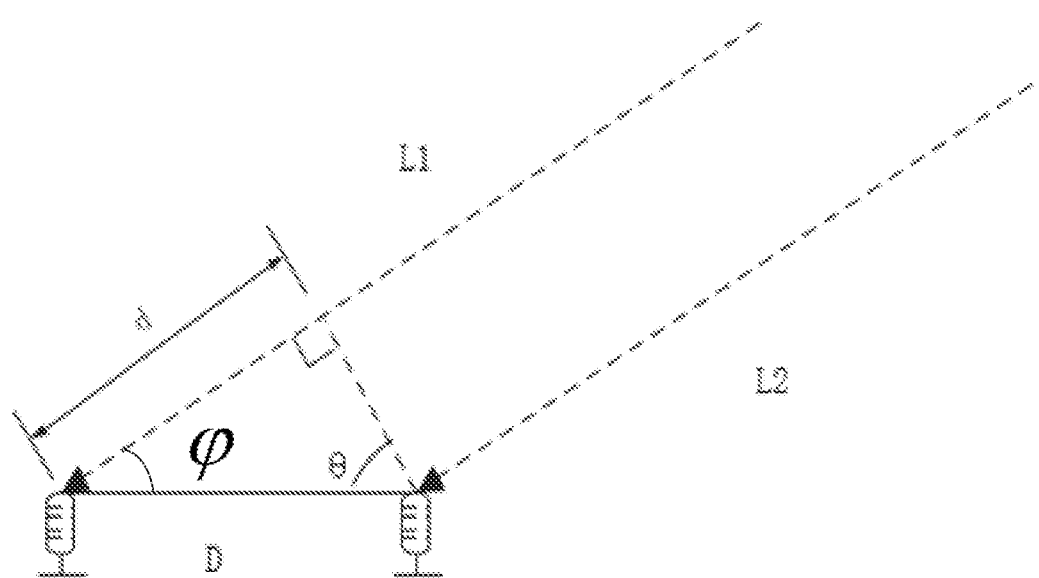
FIG. 3 illustrates a schematic diagram of calculating a relative angle between intelligent devices according to the present application.

FIG. 2 illustrates a schematic diagram of a principle of determining a relative angle between intelligent devices according to the present application. FIG. 3 illustrates a schematic diagram of calculating a relative angle between intelligent devices according to the present application. Referring to FIG. 2, a microphone a1 arranged at a bottom of an intelligent device A transmits an ultrasonic signal. The ultrasonic signal contains an MAC address of the intelligent device A. An intelligent device 13 (not shown in FIG. 2) has two microphones arranged at an interval, namely a microphone b1 and a microphone b2. The microphone b1 receives a directly reaching signal L1 of the ultrasonic signal, and the microphone b2 receives a directly reaching signal L2 of the ultrasonic signal. Non-directly reaching signals of the ultrasonic signal that are reflected by obstacles and reach the microphone b1 and microphone b2 do not participate in subsequent relative angle calculation. Since the size of intelligent devices are small, especially when two intelligent devices are far apart, directly reaching signals L1 and L2 can be considered as parallel lines.

Referring to FIGS. 3, L1 and L2 respectively represent directly reaching signals (not signals reflected by obstacles) respectively received by the microphone b1 and the microphone b2; D is a distance between the microphone b1 and the microphone b2; for example, in a case that the microphone b1 and the microphone b2 are respectively arranged at upper and lower ends of the intelligent device B, then D may be the length of the intelligent device B; d is a distance difference between L1 and L2; a delay time difference t between the directly reaching signal L1 and the directly reaching signal L2 can be determined by using a signal related algorithm; d can be calculated based on the delay time difference t, where d=t*c, c is the propagation speed of sound in a medium (such as air); θ is an assisting angle, where $$\theta = \arcsin\left(\frac{d}{D}\right).$$

Therefore, the relative angle φ between the intelligent device A and the intelligent device B can be calculated, where $$\varphi = \frac{\pi}{2} - \theta.$$

Figure 6:
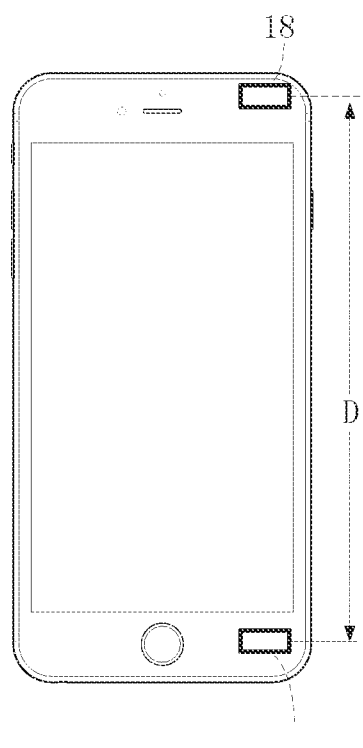
FIG. 6 illustrates a schematic diagram of first exemplary arrangement of a first sound detection module and a second sound detection module in an intelligent device according to the present application.
Figure 7:
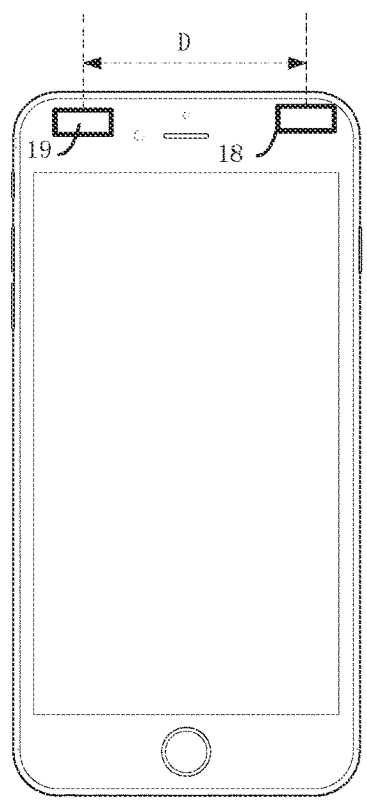
FIG. 7 illustrates a schematic diagram of second exemplary arrangement of a first sound detection module and a second sound detection module in an intelligent device according to the present application.

Exemplarily, the intelligent device A and the intelligent device B may be implemented as at least one of intelligent phones, tablet PCs, intelligent watches, intelligent wristbands, intelligent speakers, intelligent TVs, wearable devices, intelligent robots, intelligent number machines, and so on. The first sound detection module and the second sound detection module may be arranged at a plurality of positions of the intelligent device. FIG. 6 illustrates a schematic diagram of first exemplary arrangement of a first sound detection module and a second sound detection module in an intelligent device according to the present application. In FIG. 6, a first sound detection module 18 and a second sound detection module 19 are respectively arranged at two ends of an intelligent device in a length direction, so the length D of the intelligent device can be directly determined as the distance between the first sound detection module 18 and the second sound detection module 19. FIG. 7 illustrates a schematic diagram of second exemplary arrangement of a first sound detection module and a second sound detection module in an intelligent device according to the present application. In FIG. 7, the first sound detection module 18 and the second sound detection module 19 are respectively arranged at two ends of the intelligent device in a width direction, so the width D of the intelligent device can be directly determined as the distance between the first sound detection module 18 and the second sound detection module 19.

The schematic diagram of arrangement of the first sound detection module and the second sound detection module in the intelligent device has been exemplarily described above. Those skilled in the art can realize that such description is only exemplary and is not intended to limit the scope of protection of the present application. In fact, currently an intelligent device typically has two sets of microphones, which can be applied as the first sound detection module and the second sound detection module in the embodiments of the present application without reconstructing the intelligent device in hardware. A typical example of calculating the relative angle between the intelligent devices by using ultrasound based on the embodiments of the present application will be described below.

Figure 8:
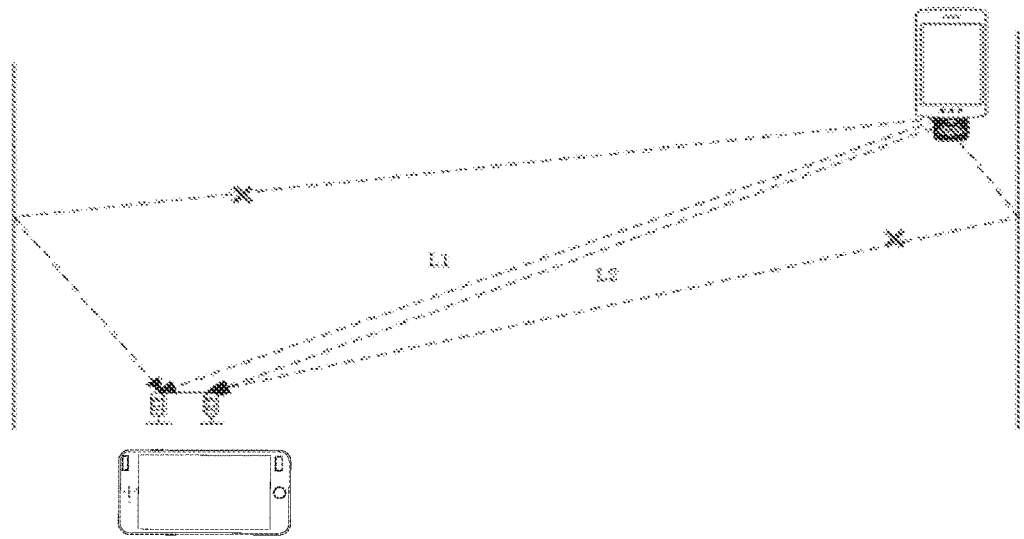
FIG. 8 illustrates a schematic diagram of relative positioning of a first intelligent device and a second intelligent device according to the present application.
Figure 9:
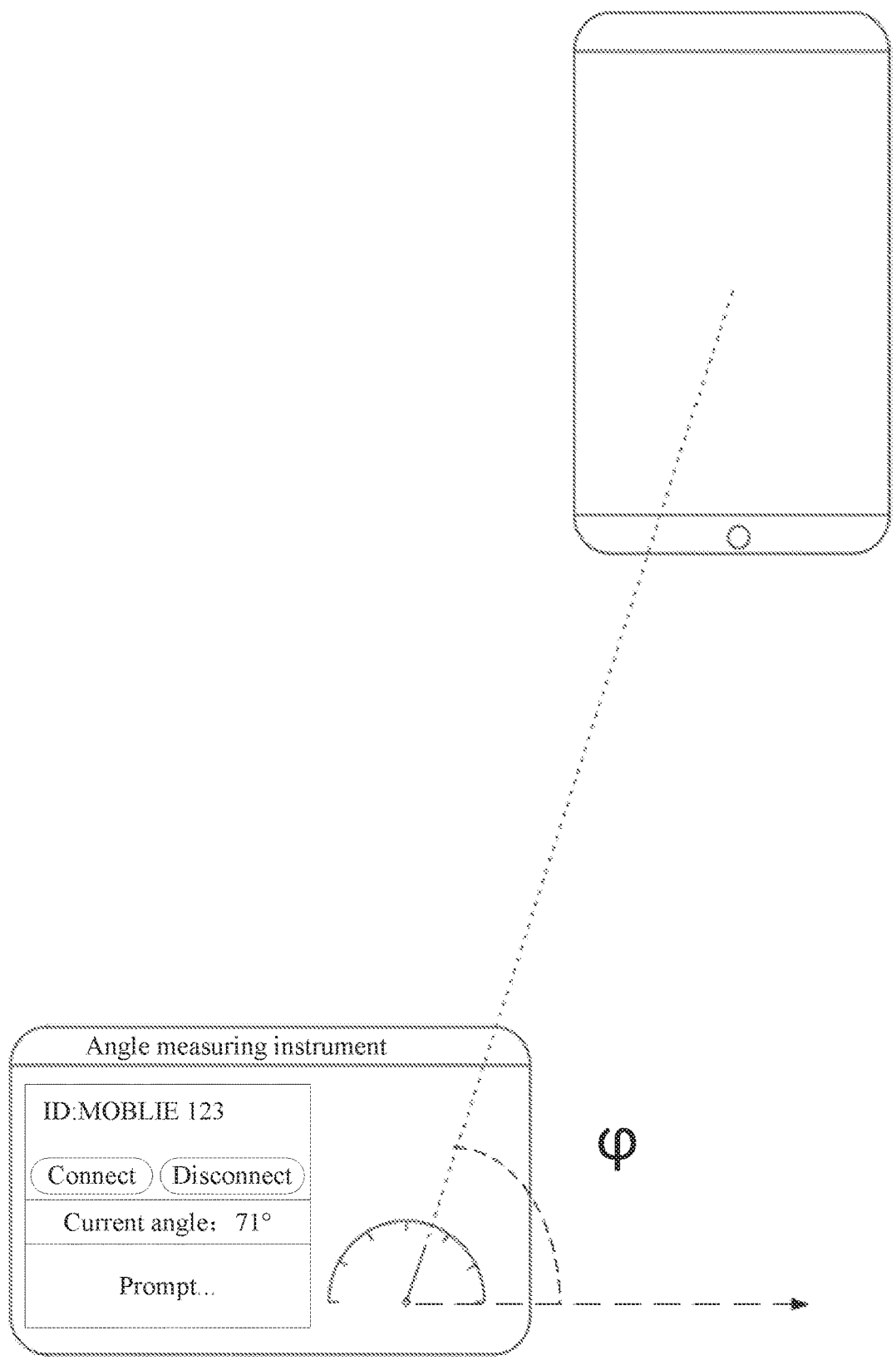
FIG. 9 illustrates a schematic diagram of showing a relative angle in an interface of an intelligent device according to the present application.
Figure 10:
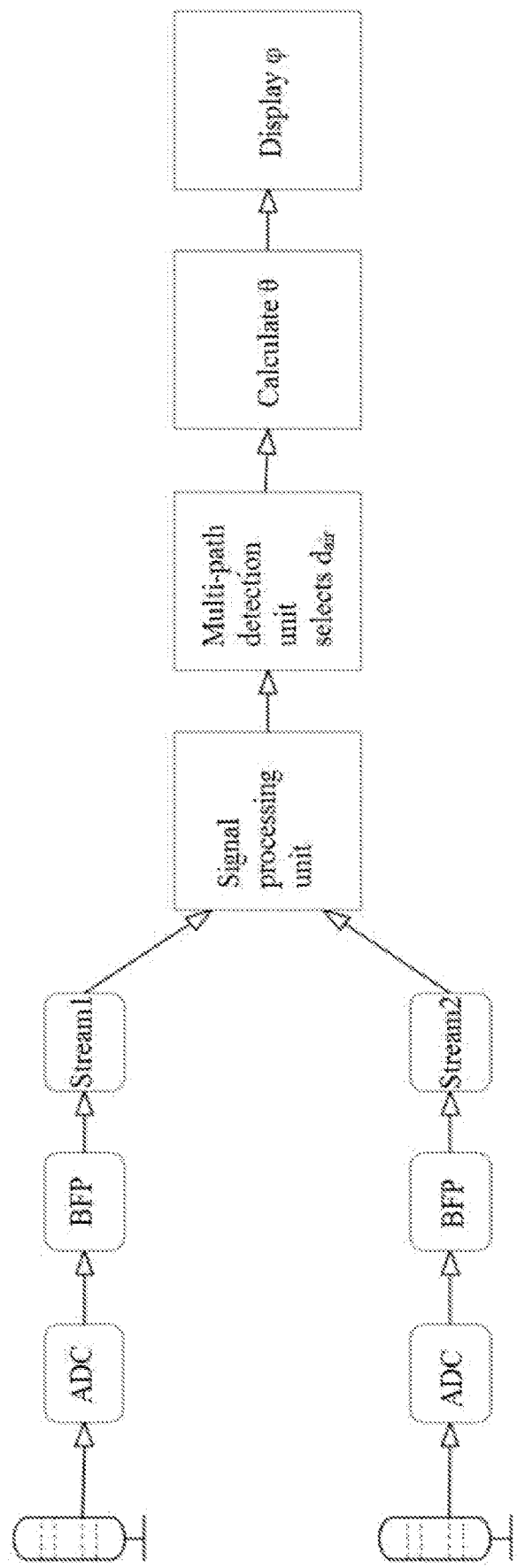
FIG. 10 illustrates an exemplary processing flowchart of relative positioning between intelligent devices according to the present application.

FIG. 8 illustrates a schematic diagram of relative positioning of a first intelligent device and a second intelligent device according to the present application. FIG. 10 illustrates an exemplary processing flowchart of relative positioning between intelligent devices according to the present application. In FIG. 7, respective processing paths of two sets of microphones for detecting sound signals are illustrated. An Analog-to-Digital Converter (ADC) is a device that converts continuous variable analog signals into discrete digital signals. A Band-Pass Filter (BPF) is a device that allows specific frequency bands of waves to pass through while shielding other frequency bands. A method for recognizing a relative direction between two intelligent devices based on ultrasound includes the following steps:

In step 1, a first intelligent device transmits a positioning signal in ultrasonic format. The positioning signal includes an MAC address of an intelligent device 1. In step 2, two sets of microphones of a second intelligent device respectively detect the positioning signal, analyze the MAC address from the detected positioning signal, and confirm that the respective detected positioning signal comes from the same sound source based on the MAC address. In step 3, the second intelligent device calculates a distance difference d between two directly reaching signals based on a time difference between the two directly reaching signals respectively detected by the two sets of microphones contained in the second intelligent device aiming at the positioning signal. In step 4, the second intelligent device calculates $$\theta = \arcsin\left(\frac{d}{D}\right),$$

angle is $$\varphi = \frac{\pi}{2} - \theta,$$

and φ is the relative angle between the first intelligent device and the second intelligent device, where D is the distance between these two sets of microphones in the second intelligent device. In step 5, the second intelligent device displays the relative angle on its own display interface, thus reminding the user of the relative direction of the first intelligent device. For example, FIG. 9 illustrates a schematic diagram of showing a relative angle in an interface of an intelligent device according to the present application. For example, it is assumed that in the environment illustrated in FIG. 8, the first intelligent device is specifically implemented as an intelligent speaker, and the second intelligent device is specifically implemented as an intelligent phone. In step 1, the intelligent speaker transmits an ultrasonic signal. The ultrasonic signal contains an MAC address of the intelligent speaker and is a signal based on CDMA technology architecture. In step 2, two microphone arrays of the intelligent phone receive the ultrasonic signal and calculate the MAC address of the intelligent speaker. At the same time, the intelligent phone calculates a distance difference d between the two directly reaching signals of the two microphone arrays. It is assumed that there are directly reaching signals with signal intensity peaks more than a threshold T in respective received signal streams stream 1 and stream 2 of the two microphone arrays, thus satisfying principle 1. Further assuming that an arrival time difference between these two directly reaching signals is $$\Delta t = \frac{2}{48000}(s),$$

d corresponding to $\Delta t$ is calculated, where $$d = \frac{2}{48000} * 340 \approx 0.014 (\mathrm{m}).$$

The distance D between the two sets of microphones is known (i.e., the length of the phone), which is assumed to be 0.145 m. Accordingly, d<D, thus satisfying principle 2. Therefore, these two directly reaching signals can be selected to calculate the relative angle, where d=0.014 (m). In step 3, the intelligent phone calculates θ=arcsin $$\left(\frac{d}{D}\right) = \arcsin\left(\frac{0.014}{0.145}\right) \approx 5.6°,$$

so the signal incidence angle is $$\varphi = \frac{\pi}{2} - \theta = 84.4°.$$

The intelligent phone displays the angle 84.4° on its own display screen, that is, the intelligent speaker is at an angle of 84.4° relative to the intelligent phone.

By using the method for recognizing the relative direction between two intelligent devices, the relative distance between the two intelligent devices can be further obtained. The following scenario is imagined: there are at least two intelligent devices; at least one intelligent device a is used for transmitting an ultrasonic positioning signal which contains an MAC address of the intelligent device a; at least one intelligent device b is used for receiving the ultrasonic positioning signal, calculating the signal incidence angle, and calculating the relative distance to the intelligent device a after further movement.

An embodiment of the present application further provides a technical solution capable of conveniently generating a control instruction based on the relative angle calculation method without requiring the user to perform a trigger operation on the display interface.

Figure 11:
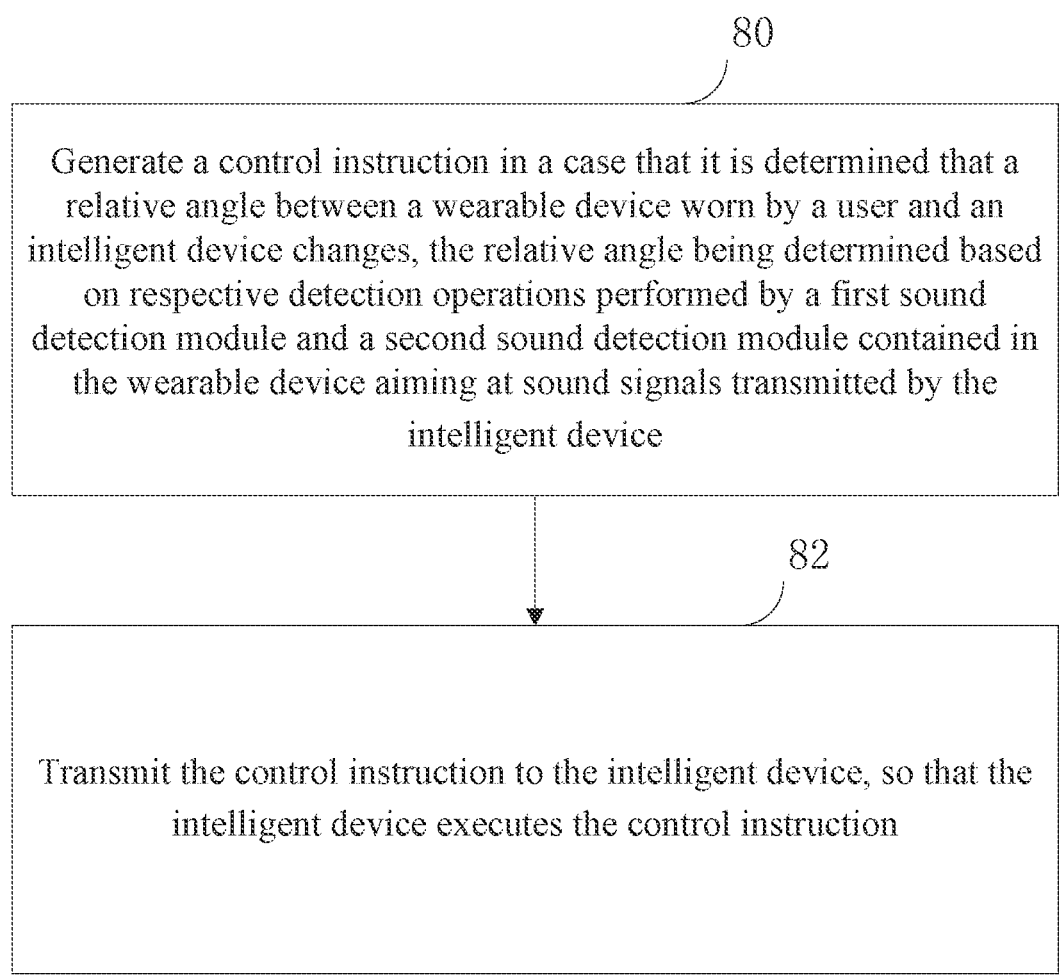
FIG. 11 illustrates a flowchart of an exemplary method for generating a control instruction according to the present application.

FIG. 11 illustrates a flowchart of an exemplary method for generating a control instruction according to the present application. Referring to FIG. 11, the method includes: step 80: generating a control instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and step 82: transmitting the control instruction to the intelligent device, so that the intelligent device executes the control instruction.

The control instruction is adapted to control the intelligent devices to perform any predetermined operation. Therefore, after the relative movement between the wearable device and the intelligent device is sensed based on the change in the relative angle, the control instruction may be generated to control the intelligent device. For example, the control instruction may include at least one of an instruction for switching a picture, an instruction for switching an article, an instruction for switching a video, an instruction for switching an audio (such as a song), an instruction for switching an email, an instruction for switching a view angle, an instruction for switching an interface, and so on.

Exemplarily, the wearable device is a head wearable device adapted to be worn on the head. The head wearable device includes an intelligent earphone or intelligent glasses. Therefore, in a case that the relative movement between the head and the intelligent device is sensed based on the change in the relative angle, the control instruction may be generated.

For example, when the user is browsing images, texts, web pages, videos or the like, if the user wants to release the hands without having to hold the intelligent device all the time, or when the user is giving a speech or attending a meeting, if the user needs to conveniently switch daily work content such as PPT, a control instruction may be generated by using the method in the embodiment of the present application. The present application can achieve the purpose of conveniently switching and browsing through images, texts and videos without requiring the user to perform a trigger operation on the display interface, thus providing a brand new virtual interactive browsing experience. For example, in a case that the wearable device leftwards moves relative to the intelligent device, an instruction for switching to a previous content of a current content is generated; in a case that the change corresponds to the rightward movement of the wearable device relative to the intelligent device, an instruction for switching to a next content for the current content is generated, and so on. Specifically, in a case that the user wearing the head wearable device (such as intelligent glasses or intelligent earphone) leftwards turns the head, the head wearable device can switch to a next picture/next novel/next PPT/next Tiktok video; in a case that the user rightwards turns the head, the head wearable device can switch to a previous picture/previous novel/previous PPT/previous Tiktok video, and so on.

Moreover, the present application can also be applied to achieve mobile phone interface sliding control. For example, in a case that the user leftwards turn the head, the main interface (APP interface) of the mobile phone leftwards slides; in a case that the user rightwards turn the head, the main interface (APP interface) of the mobile phone rightwards slides, and so on.

Exemplarily, the control instruction may be implemented as a song switching instruction, so that the intelligent device executes the song switching instruction to execute a song switching operation. For another example, the control instruction may be implemented as a view angle change instruction, so that the intelligent device adjusts a view angle of a panoramic image showing a house displayed in the display interface of the intelligent device based on the view angle change instruction.

A typical example of the control instruction has been exemplarily described above. Those skilled in the art can realize that such description is only exemplary and is not intended to limit the scope of protection of the present application.

In an embodiment, determining the relative angle includes:

detecting, by the first sound detection module in the wearable device, a first sound signal directly reaching the first sound detection module from the intelligent device, and detecting, by the second sound detection module in the wearable device, a second sound signal directly reaching the second sound detection module from the intelligent device, wherein the first sound signal and the second sound signal are simultaneously transmitted by the intelligent device; determining a time difference between a receiving time of the first sound signal and a receiving time of the second sound signal; and determining the relative angle based on a distance between the first sound detection module and the second sound detection module and the time difference. Exemplarily, determining the relative angle includes: determining θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determining the relative angle φ based on θ, where $$\varphi = \frac{\pi}{2} - \theta.$$

An embodiment of the present application further provides an apparatus for generating a control instruction, which includes: a generation module configured to generate a control instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and a transmitting module configured to transmit the control instruction to the intelligent device, so that the intelligent device executes the control instruction.

An embodiment of the present application further provides a method for generating a control instruction, which includes: generating a control instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and executing an operation corresponding to the control instruction in the intelligent device in response to the control instruction. Exemplarily, the wearable device is a head wearable device adapted to be worn on the head. The head wearable device includes an intelligent earphone or intelligent glasses. Determining the relative angle includes: detecting, by the first sound detection module in the intelligent device, a first sound signal directly reaching the first sound detection module from the wearable device, and detecting, by the second sound detection module in the intelligent device, a second sound signal directly reaching the second sound detection module from the wearable device, wherein the first sound signal and the second sound signal are simultaneously transmitted by the wearable device; determining a time difference between a receiving time of the first sound signal and a receiving time of the second sound signal; and determining the relative angle based on a distance between the first sound detection module and the second sound detection module and the time difference. Exemplarily, determining the relative angle includes: determining θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determining the relative angle φ based on θ, where $$\varphi = \frac{\pi}{2} - \theta.$$

An embodiment of the present application further provides an apparatus for generating a control instruction, which includes: a generation module configured to generate a control instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and an execution module configured to execute an operation corresponding to the control instruction in the intelligent device in response to the control instruction.

Control instructions can be generated in various application environments by using the embodiment of the present application.

For example, for many music enthusiasts, it is very important to enjoy their favorite music at any time. To meet the needs of listening to music, there are currently various similar listening devices and APPs available. In the listening process, there is often a need to switch songs. Switching songs means adjusting the order of song play, such as forcing a current song to stop playing and start playing the next song before the current song is played completely. At present, when the user expects to switch a song, the user usually needs to click on a predetermined trigger control in a song play interface to achieve song switching. By applying the embodiment of the present application to generate a control instruction, the present application can conveniently switch a song without requiring the user to perform a trigger operation on the display interface, thus providing a brand new virtual interactive music listening experience.

Based on the above description, the embodiment of the present application further provides a technical solution for switching a song based on the relative angle calculation method mentioned above.

FIG. 12 illustrates a flowchart of a first exemplary method for switching a song according to the present application. The method can be executed by a wearable device. Referring to FIG. 12, the method includes step 1201 and step 1202. In step 1201, a song switching instruction is generated in a case that it is determined that a relative angle between a wearable device worn by a user and an intelligent device changes, wherein the relative angle is determined based on respective detection operations performed by a first sound detection module and a second sound detection module contained in the wearable device aiming at sound signals (exemplarily ultrasonic signals) transmitted by the intelligent device. In step 1202, the song switching instruction is transmitted to the intelligent device, so that the intelligent device executes a song switching operation in response to the song switching instruction. Therefore, the song which is being played by the intelligent device can be switched. For example, the wearable device transmits the song switching instruction to the intelligent device based on communication modes such as Bluetooth, infrared, ZigBee, and 4G/5G.

It can be seen that in the process of determining the relative angle, the wearable device in FIG. 12 is equivalent to the first intelligent device in the method illustrated in FIG. 1. The intelligent device containing a sound source (exemplarily ultrasonic source) in FIG. 12 is equivalent to the second intelligent device in the method illustrated in FIG. 1.

In an embodiment, determining the relative angle includes: detecting, by the first sound detection module in the wearable device, a first sound signal directly reaching the first sound detection module from the intelligent device, and detecting, by the second sound detection module in the wearable device, a second sound signal directly reaching the second sound detection module from the intelligent device, wherein the first sound signal and the second sound signal are simultaneously transmitted by the intelligent device; determining a time difference between a receiving time of the first sound signal and a receiving time of the second sound signal; and determining the relative angle based on a distance between the first sound detection module and the second sound detection module and the time difference. In an embodiment, determining the relative angle includes: determining θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determining the relative angle φ based on θ, where $$\varphi = \frac{\pi}{2} - \theta.$$

Figure 13:
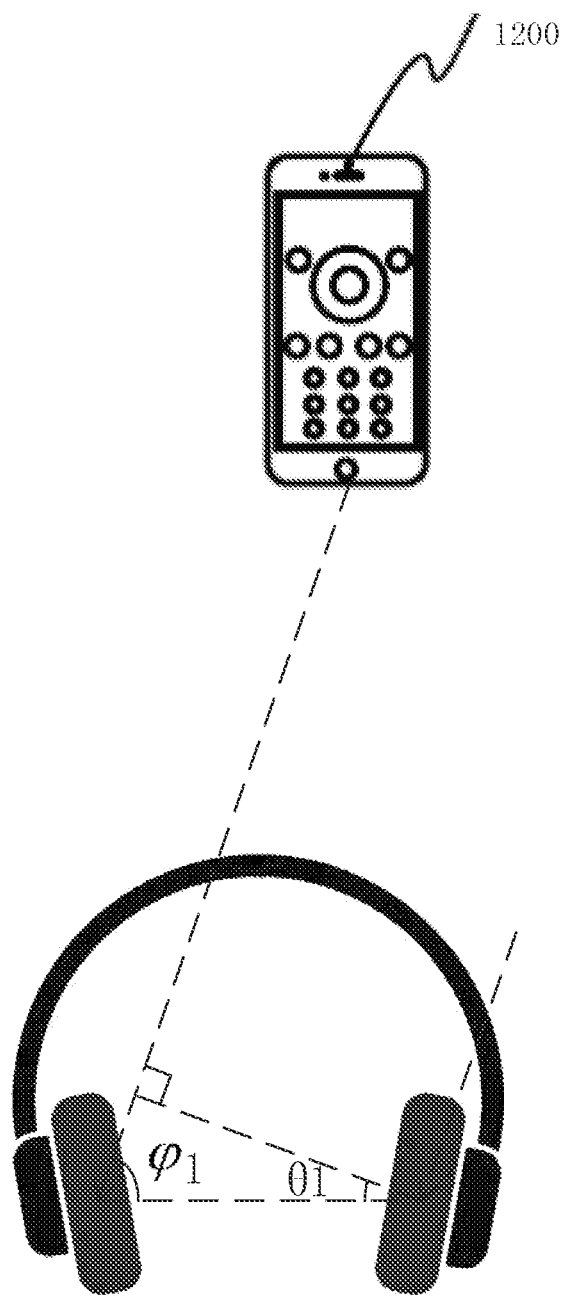
FIG. 13 illustrates a schematic diagram when a user wearing an intelligent earphone is located at an initial position according to the present application.

In an embodiment, generating a song switching instruction includes at least one of: generating an instruction for switching to a previous song of a current song in a case that the change corresponds to leftward movement of the wearable device relative to the intelligent device; generating an instruction for switching to a next song of a current song in a case that the change corresponds to rightward movement of the wearable device relative to the intelligent device; generating an instruction for switching to a next song of a current song in a case that the change corresponds to leftward movement of the wearable device relative to the intelligent device; generating an instruction for switching to a previous song of a current song in a case that the change corresponds to rightward movement of the wearable device relative to the intelligent device; and so on, The present application will be described below by taking the wearable device being implemented as an intelligent earphone as an example. FIG. 13 illustrates a schematic diagram when a user wearing an intelligent earphone is located at an initial position according to the present application. It is assumed that a difference in signal arrival time is the signal arrival time of the first sound detection module minus the signal arrival time of the second sound detection module. As can be seen from FIG. 13, at the initial position (for example, when the user wearing the intelligent earphone faces the intelligent device 1200), the first sound detection module (such as microphone or microphone array) in the left earphone of the intelligent earphone and the second sound detection module (such as microphone or microphone array) in the right earphone of the intelligent earphone respectively receive sound signals transmitted by the intelligent device 1200 (such as intelligent phone). Based on the method for determining the relative angle illustrated in FIG. 1, the intelligent earphone determines that the relative angle at this time is φ1.

Figure 14:
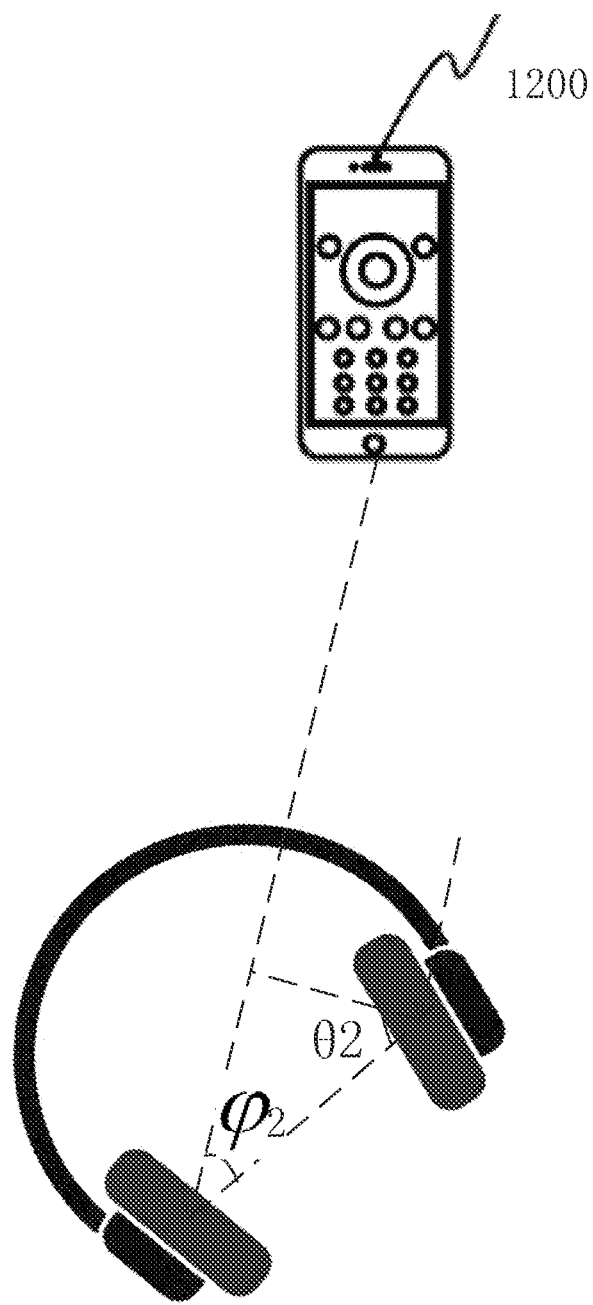
FIG. 14 illustrates a schematic diagram when a user wearing an intelligent earphone tilts the head leftwards.

When the user wearing the intelligent earphone moves leftwards (for example, when the user tilts the head leftwards or translates leftwards), the intelligent earphone detects that the relative angle changes. FIG. 14 illustrates a schematic diagram when a user wearing an intelligent earphone tilts the head leftwards. As can be seen from FIG. 14, when the user wearing the intelligent earphone tilts the head leftwards, the first sound detection module (such as microphone or microphone array) in the left earphone of the intelligent earphone and the second sound detection module (such as microphone or microphone array) in the right earphone of the intelligent earphone continue to respectively receive sound signals transmitted by the intelligent device 1200 (such as intelligent phone). Based on the method for determining the relative angle illustrated in FIG. 1, the intelligent earphone determines that the relative angle at this time is φ2. It can be seen that φ2 is less than φ1. Similarly, the relative angle also decreases when the intelligent earphone translates leftwards.

Figure 15:
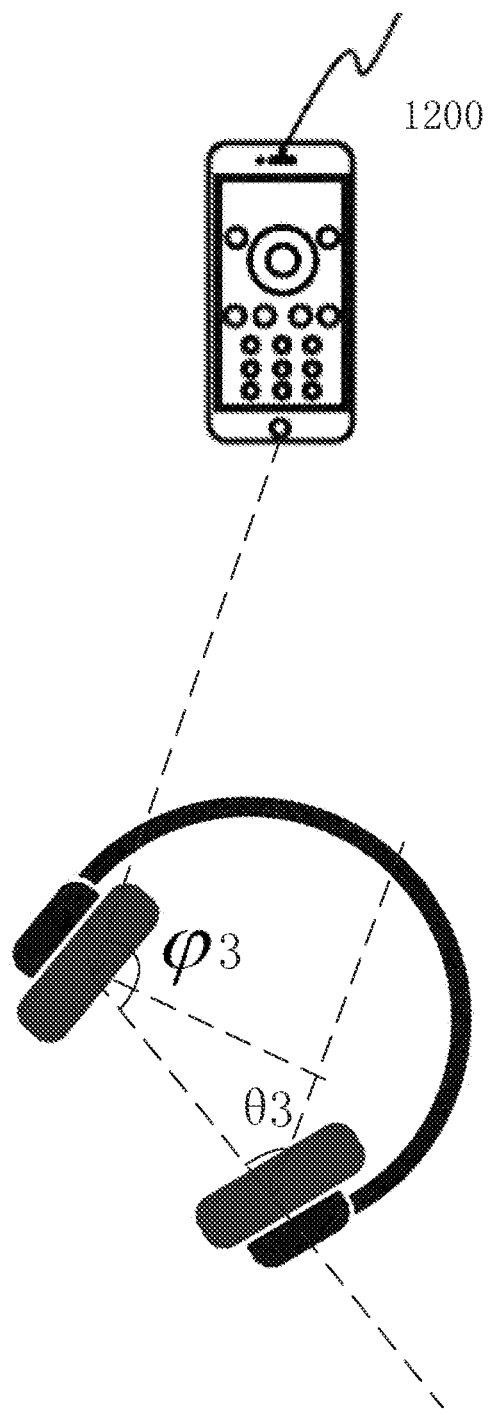
FIG. 15 illustrates a schematic diagram when a user wearing an intelligent earphone tilts the head rightwards.

When the user wearing the intelligent earphone moves rightwards (for example, when the user tilts the head rightwards or translates rightwards), the intelligent earphone detects that the relative angle changes. FIG. 15 illustrates a schematic diagram when a user wearing an intelligent earphone tilts the head rightwards. As can be seen from FIG. 15, when the user wearing the intelligent earphone tilts the head rightwards, the first sound detection module (such as microphone or microphone array) in the left earphone of the intelligent earphone and the second sound detection module (such as microphone or microphone array) in the right earphone of the intelligent earphone continue to respectively receive sound signals transmitted by the intelligent device 1200 (such as intelligent phone). Based on the method for determining the relative angle illustrated in FIG. 1, the intelligent earphone determines that the relative angle at this time is φ3. It can be seen that φ3 is more than φ1. Similarly, the relative angle also increases when the intelligent earphone translates rightwards.

Therefore, by determining the change of the relative angle relative to the initial value (φ1), the moving direction of the user wearing the intelligent earphone can be determined. Specifically, in a case that it is determined that the current relative angle is less than the initial value (φ1), it is determined that the user wearing the intelligent earphone moves leftwards (for example, the user tilts the head); in a case that it is determined that the current relative angle is more than the initial value (φ1), it is determined that the user wearing the intelligent earphone moves rightwards (for example, the user tilts the head).

For example (1), in a case that the intelligent earphone determines that the user wearing the intelligent earphone translates leftwards, the intelligent earphone may generate an instruction for switching to a previous song of a current song in a playlist, and transmits the instruction to the intelligent device 1200 based on the communication connection. The song play resource in the intelligent device 1200 slops playing the current song and starts playing the previous song in the playlist in response to the instruction.

For example (2), in a case that the intelligent earphone determines that the user wearing the intelligent earphone translates rightwards, the intelligent earphone may generate an instruction for switching to a next song of a current song in a playlist, and transmits the instruction to the intelligent device 1200 based on the communication connection. The song play resource in the intelligent device 1200 stops playing the current song and starts playing the next song in the playlist in response to the instruction.

For example (3), in a case that the intelligent earphone determines that the user wearing the intelligent earphone translates leftwards, the intelligent earphone may generate an instruction for switching to a next song of a current song in a playlist, and transmits the instruction to the intelligent device 1200 based on the communication connection. The song play resource in the intelligent device 1200 stops playing the current song and starts playing the next song in the playlist in response to the instruction.

For example (4), in a case that the intelligent earphone determines that the user wearing the intelligent earphone translates rightwards, the intelligent earphone may generate an instruction for switching to a previous song of a current song in a playlist, and transmits the instruction to the intelligent device 1200 based on the communication connection. The song play resource in the intelligent device 1200 stops playing the current song and starts playing the previous song in the playlist in response to the instruction.

In the above examples, the song is switched in an order according to the playlist, that is, the song jumps by one at each time. In fact, based on user settings, it is possible to make the song jump by more than one at each time, which is not limited in the embodiment of the present application.

Figure 16:
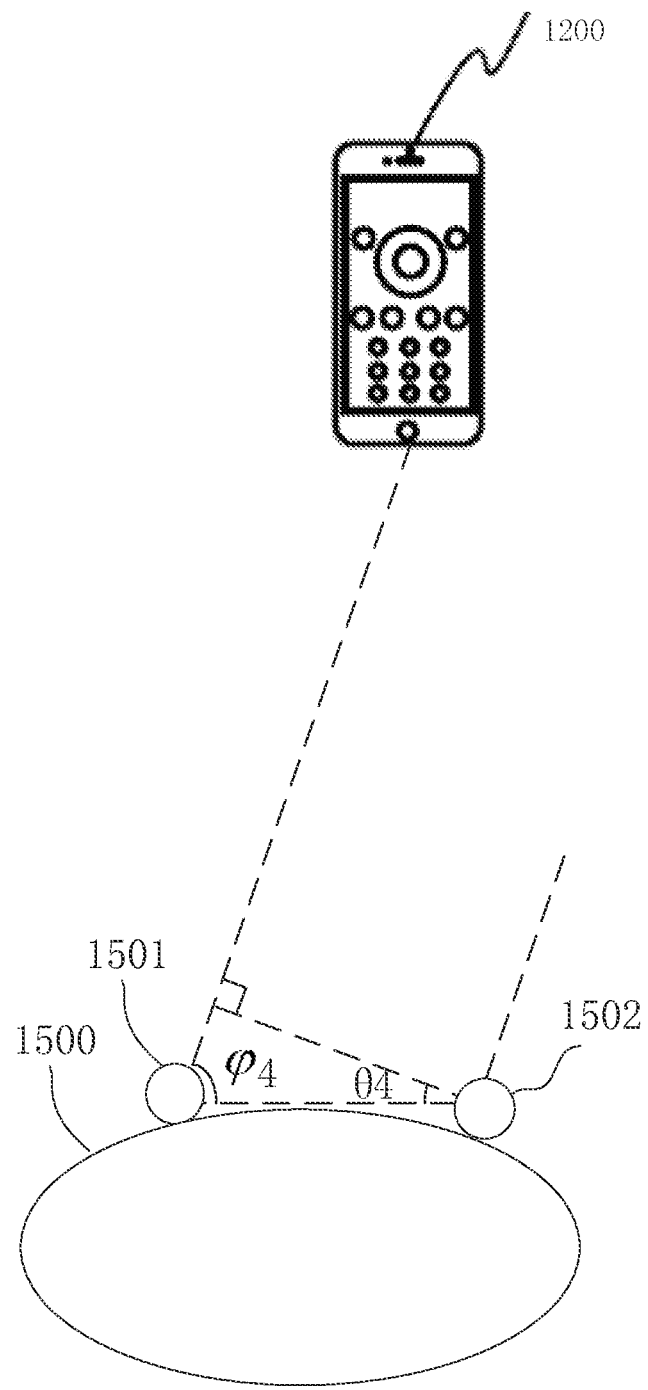
FIG. 16 illustrates a schematic diagram when a user wearing an intelligent wristband is located at an initial position according to the present application.

The present application will be described below by taking the wearable device being implemented as an intelligent wristband as an example. FIG. 16 illustrates a schematic diagram when a user wearing an intelligent wristband is located at an initial position according to the present application. It is assumed that the difference in signal arrival time is the signal arrival time of the first sound detection module minus the signal arrival time of the second sound detection module. As can be seen from FIG. 16, at the initial position (such as when the user wearing the intelligent wristband faces the intelligent device 1200), the first sound detection module 1501 (such as microphone or microphone array) in the left area of the intelligent wristband 1500 and the second sound detection module 1502 (such as microphone or microphone array) in the right area of the intelligent wristband 1500 respectively receive sound signals transmitted by the intelligent devices 1200 (such as intelligent phone). Based on the method for determining the relative angle illustrated in FIG. 1, the intelligent wristband 1500 determines that the relative angle at this time is φ4.

Figure 17:
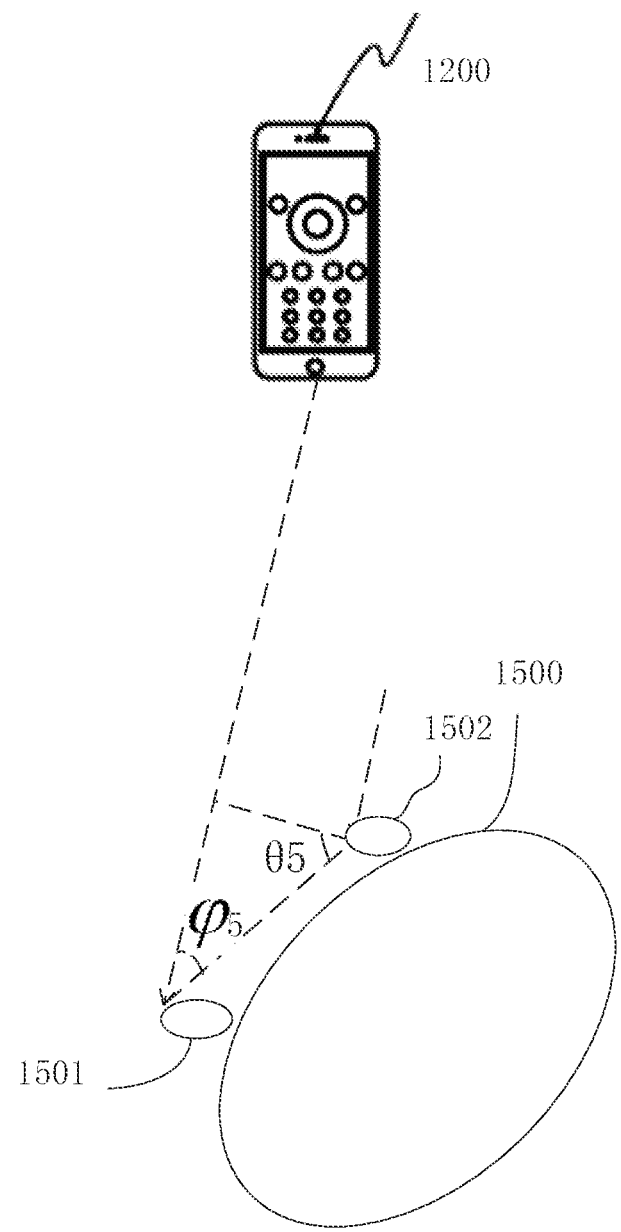
FIG. 17 illustrates a schematic diagram when a user wearing an intelligent wristband turns the arm leftwards according to the present application.

When the hand of the user wearing the intelligent wristband turns leftwards (for example, turns the arm leftwards using the elbow joint as a pivot, that is, in a counterclockwise direction relative to the user), the intelligent wristband detects that the relative angle changes. FIG. 17 illustrates a schematic diagram when a user wearing an intelligent wristband turns the arm leftwards according to the present application. As can be seen from FIG. 17, when the user wearing the intelligent wristband 1500 turns the arm leftwards, the first sound detection module 1501 (such as microphone or microphone array) in the left half area of the intelligent wristband 1500 and the second sound detection module 1502 (such as microphone or microphone array) in the right half area of the intelligent wristband 1500 continue to respectively receive sound signals transmitted by the intelligent device 1200 (such as intelligent phone). Based on the method for determining the relative angle illustrated in FIG. 1, the intelligent wristband determines that the relative angle at this time is φ5. It can be seen that φ5 is less than φ4.

Figure 18:
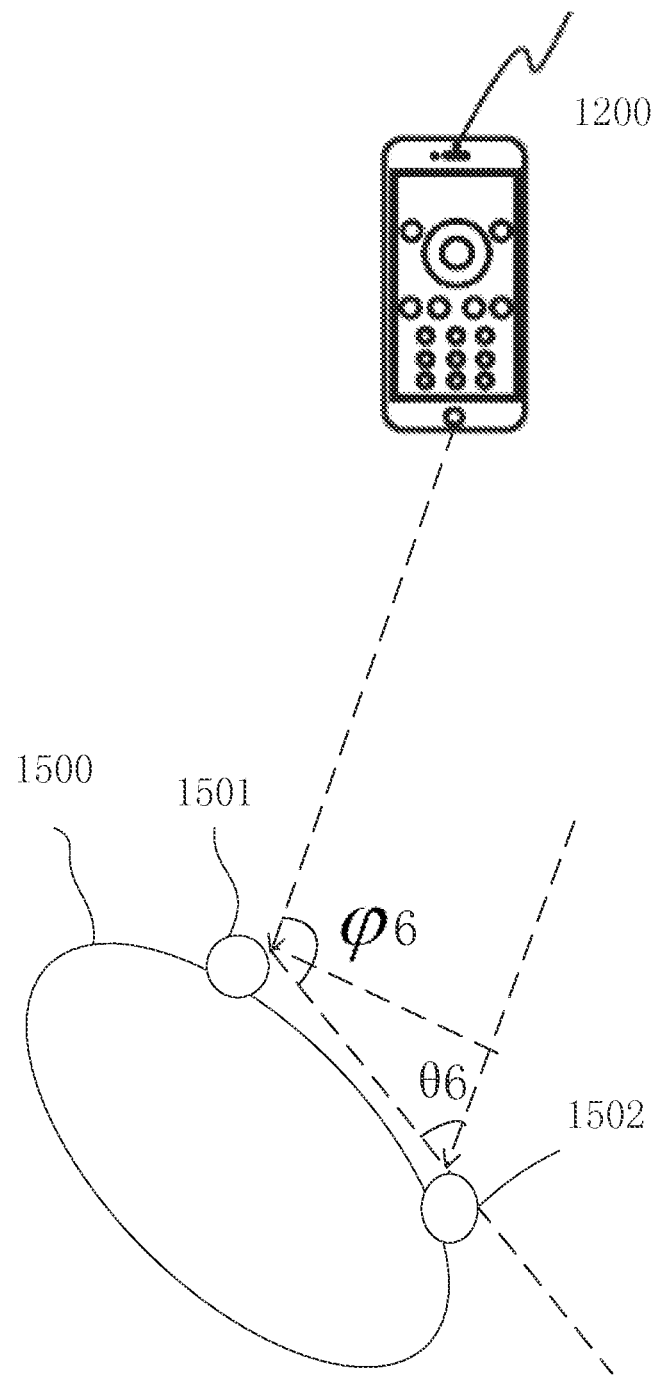
FIG. 18 illustrates a schematic diagram when a user wearing an intelligent wristband turns the arm rightwards according to the present application.

When the user wearing the intelligent wristband turns the arm rightwards (for example, turns the arm rightwards using the elbow joint as a pivot, that is, in a clockwise direction relative to the user), the intelligent wristband detects that the relative angle changes. FIG. 18 illustrates a schematic diagram when a user wearing an intelligent wristband turns the arm rightwards according to the present application. As can be seen from FIG. 18, when the user wearing the intelligent wristband turns the arm rightwards, the first sound detection module 1501 (such as microphone or microphone array) in the left half area of the intelligent wristband 1500 and the second sound detection module 1502 (such as microphone or microphone array) in the right half area of the intelligent wristband 1500 continue to respectively receive sound signals transmitted by the intelligent device 1200 (such as intelligent phone). Based on the method for determining the relative angle illustrated in FIG. 1, the intelligent wristband determines that the relative angle at this time is φ6. It can be seen that φ6 is more than φ4.

Therefore, by determining the change of the relative angle relative to the initial value (φ4), the moving direction of the hand of the user can be determined. Specifically, in a case that it is determined that the current relative angle is less than the initial value (φ4), it is determined that the user wearing the intelligent wristband turns the arm leftwards; in a case that it is determined that the current relative angle is more than the initial value (φ4), it is determined that the user wearing the intelligent wristband turns the arm rightwards.

Similarly, after determining the moving direction of the hand of the user, a song switching instruction corresponding to the moving direction may be generated. For example, when the intelligent wristband moves leftwards relative to the intelligent device, an instruction for switching to a previous song of a current song is generated; when the intelligent wristband moves rightwards relative to the intelligent device, an instruction for switching to a next song of a current song is generated; when the intelligent wristband moves leftwards relative to the intelligent device, an instruction for switching to a next song of a current song is generated; when the intelligent wristband moves rightwards relative to the intelligent device, an instruction for switching to a previous song of a current song is generated; and so on.

Figure 19:
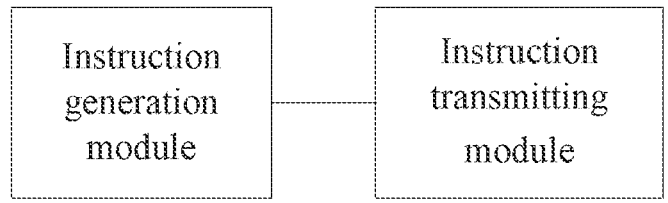
FIG. 19 illustrates a structural diagram of a first exemplary apparatus for switching a song according to the present application.

FIG. 19 illustrates a structural diagram of an apparatus for switching a song according to the present application. The apparatus includes: an instruction generation module configured to generate a song switching instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and an instruction transmitting module configured to transmit the song switching instruction to the intelligent device, so that the intelligent device executes a song switching operation in response to the song switching instruction. Exemplarily, the instruction generation module is configured to enable the first sound detection module in the wearable device to detect a first sound signal directly reaching the first sound detection module from the intelligent device, and enable the second sound detection module in the wearable device to detect a second sound signal directly reaching the second sound detection module from the intelligent device, wherein the first sound signal and the second sound signal are simultaneously transmitted by the intelligent device; determine a time difference between a receiving time of the first sound signal and a receiving time of the second sound signal; and determine the relative angle based on a distance between the first sound detection module and the second sound detection module and the time difference. Exemplarily, the instruction generation module is configured to determine θ based on $$\theta = \arcsin\left(\frac{d}{D}\right),$$

where arcsin is an arcsin function, d=t c, t is the time difference, c is the propagation speed of sound, and D is the distance between the first sound detection module and the second sound detection module; and determine the relative angle φ based on θ, where $$\varphi = \frac{\pi}{2} - \theta.$$

In an embodiment, the instruction generation module is configured to execute at least one of: generating an instruction for switching to a previous song of a current song in a case that the change corresponds to leftward movement of the wearable device relative to the intelligent device; generating an instruction for switching to a next song of a current song in a case that the change corresponds to rightward movement of the wearable device relative to the intelligent device; generating an instruction for switching to a next song of a current song in a case that the change corresponds to leftward movement of the wearable device relative to the intelligent device; and generating an instruction for switching to a previous song of a current song in a case that the change corresponds to rightward movement of the wearable device relative to the intelligent device.

An embodiment of the present application further provides a wearable device, which includes: a first sound detection module; a second sound detection module; a control module configured to generate a song switching instruction in a case that it is determined that a relative angle between the wearable device worn by a user and an intelligent device changes, wherein the relative angle is determined based on respective detection operations performed by the first sound detection module and the second sound detection module contained in the wearable device aiming at sound signals transmitted by the intelligent device; and a communication module configured to transmit the song switching instruction to the intelligent device, so that the intelligent device executes a song switching operation in response to the song switching instruction. Exemplarily, the wearable device may include an intelligent earphone, intelligent glasses, an intelligent watch, an intelligent wristband, an intelligent ankle ring, and so on.

Figure 20:
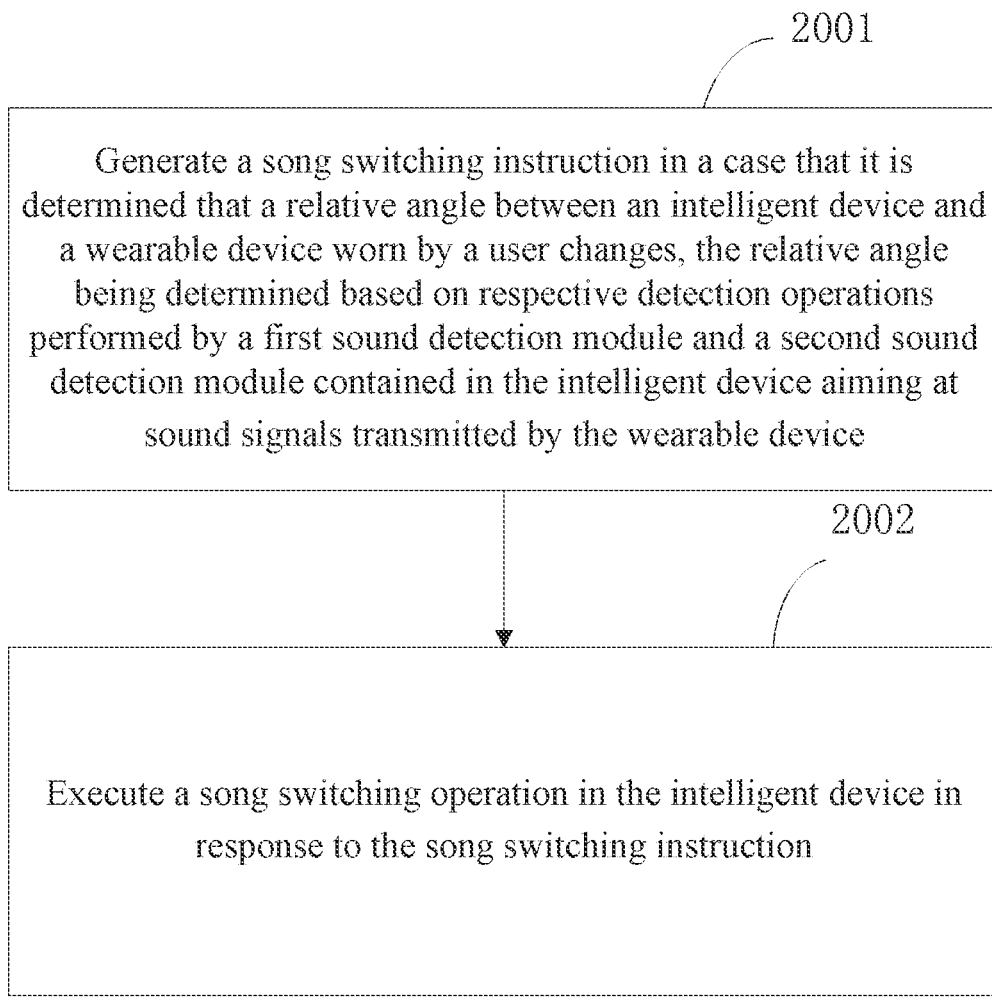
FIG. 20 illustrates a flowchart of a second exemplary method for switching a song according to the present application.

FIG. 20 illustrates a flowchart of a second exemplary method for switching a song according to the present application. The method may be executed by an intelligent device. Referring to FIG. 20, the method includes step 2001 and step 2002. In step 2001, a song switching instruction is generated in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device. In step 2002, a song switching operation is executed in the intelligent device in response to the song switching instruction.

It can be seen that in the process of determining the relative angle, the intelligent device in FIG. 20 is equivalent to the first intelligent device in the method illustrated in FIG. 1; the wearable device containing a sound source in FIG. 20 is equivalent to the second intelligent device in the method illustrated in FIG. 1. Therefore, the embodiment of the present application can conveniently switch a song without requiring the user to perform a trigger operation on the display interface, thus providing a brand new virtual interactive music listening experience.

In an embodiment, determining the relative angle includes: detecting, by the first sound detection module in the intelligent device, a first sound signal directly reaching the first sound detection module from the wearable device, and detecting, by the second sound detection module in the intelligent device, a second sound signal directly reaching the second sound detection module from the wearable device, wherein the first sound signal and the second sound signal are simultaneously transmitted by the wearable device; determining a time difference between a receiving time of the first sound signal and a receiving time of the second sound signal; and determining the relative angle based on a distance between the first sound detection module and the second sound detection module and the time difference. In an embodiment, determining the relative angle includes: determining θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determining the relative angle φ based on θ, where $$\varphi = \frac{\pi}{2} - \theta.$$

In an embodiment, generating a song switching instruction includes at least one of: generating an instruction for switching to a previous song of a current song in a case that the change corresponds to leftward movement of the wearable device relative to the intelligent device; generating an instruction for switching to a next song of a current song in a case that the change corresponds to rightward movement of the wearable device relative to the intelligent device; generating an instruction for switching to a next song of a current song in a case that the change corresponds to leftward movement of the wearable device relative to the intelligent device; generating an instruction for switching to a previous song of a current song in a case that the change corresponds to rightward movement of the wearable device relative to the intelligent device; and so on. Exemplarily, the wearable device may include an intelligent earphone, an intelligent watch, an intelligent wristband, intelligent glasses, an intelligent ankle ring, and so on.

Figure 21:
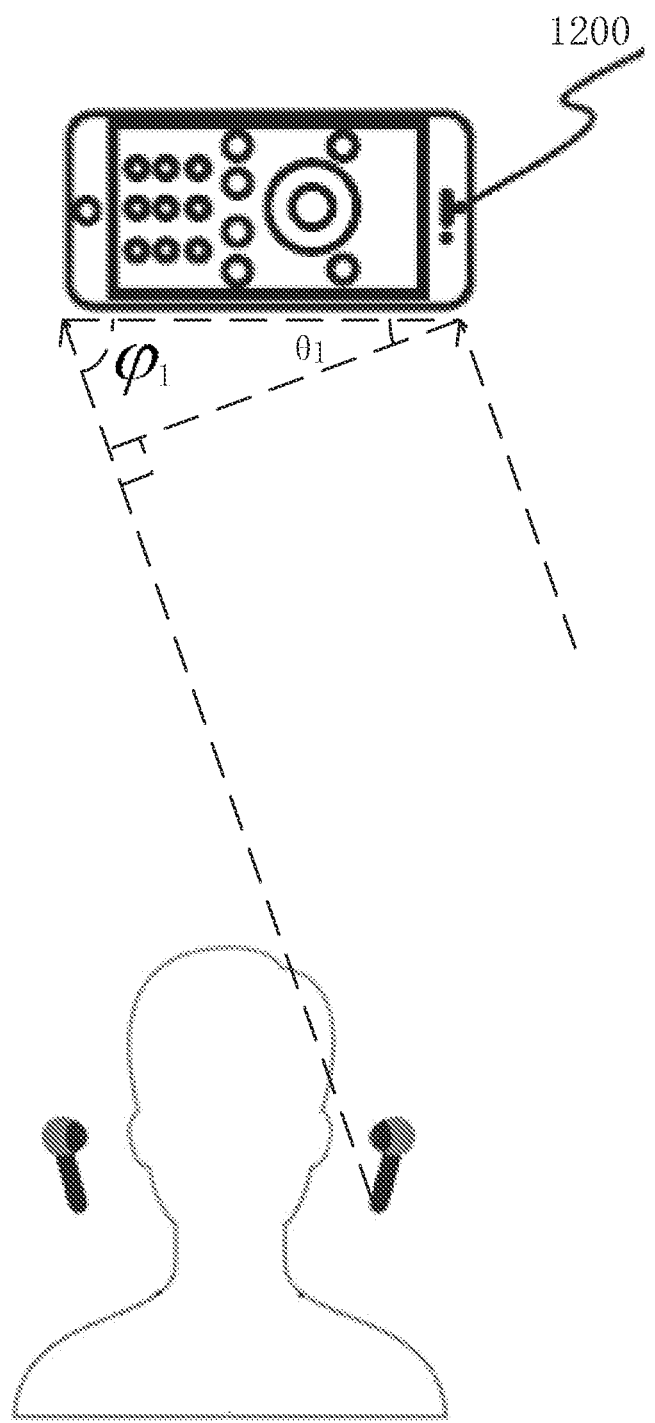
FIG. 21 illustrates a schematic diagram when a user wearing an intelligent earphone is located at an initial position according to the present application.

The present application will be described below by taking the wearable device being implemented as an intelligent earphone. FIG. 21 illustrates a schematic diagram when a user wearing an intelligent earphone is located at an initial position according to the present application. It is assumed that the difference in signal arrival time is always the signal arrival time of the first sound detection module minus the signal arrival time of the second sound detection module. As can be seen from FIG. 21, at the initial position (for example, when the user wearing the intelligent earphone faces the intelligent device 1200), the first sound detection module (such as microphone or microphone array) in the intelligent device 1200 and the second sound detection module (such as microphone or microphone array) in the intelligent device 1200 respectively receive sound signals (such as ultrasonic signals) transmitted by the same intelligent earphone (such as the intelligent earphone worn on the right ear of the user illustrated in FIG. 21). Based on the method for determining the relative angle illustrated in FIG. 1, the intelligent device 1200 determines that the relative angle at this time is φ1.

Figure 22:
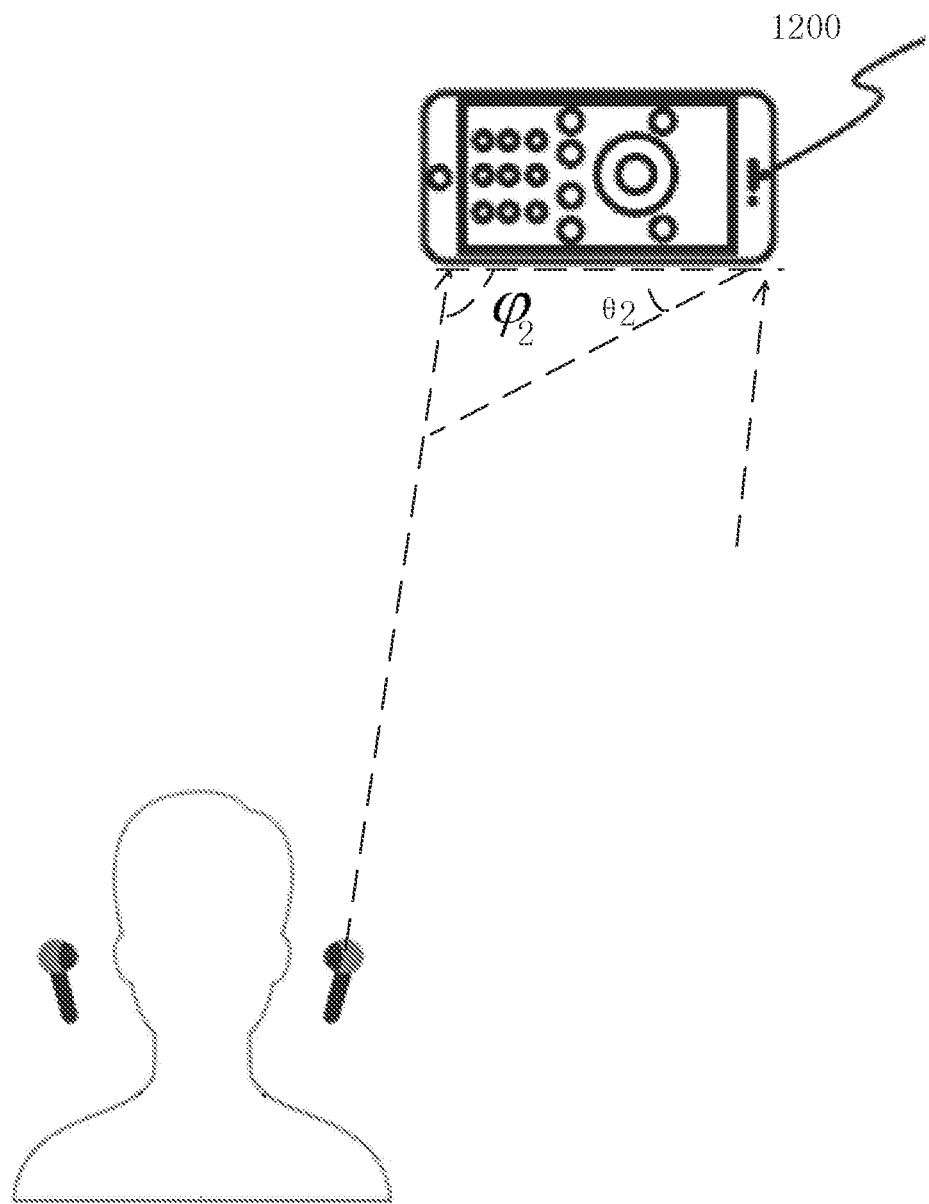
FIG. 22 illustrates a schematic diagram when a user wearing an intelligent earphone translates leftwards according to the present application.

When the user wearing the intelligent earphone translates leftwards, the intelligent device 1200 detects that the relative angle changes. FIG. 22 illustrates a schematic diagram when a user wearing an intelligent earphone translates leftwards according to the present application. As can be seen from FIG. 22, when the user wearing the intelligent earphone translates leftwards, the first sound detection module (such as microphone or microphone array) in the intelligent device 1200 and the second sound detection module (such as microphone or microphone array) in the intelligent device 1200 continue to respectively receive sound signals transmitted by the same intelligent earphone (such as the intelligent earphone worn on the right ear of the user illustrated in FIG. 22). Based on the method for determining the relative angle illustrated in FIG. 1, the intelligent device determines that the relative angle at this time is φ2. It can be seen that φ2 is more than φ1.

Figure 23:
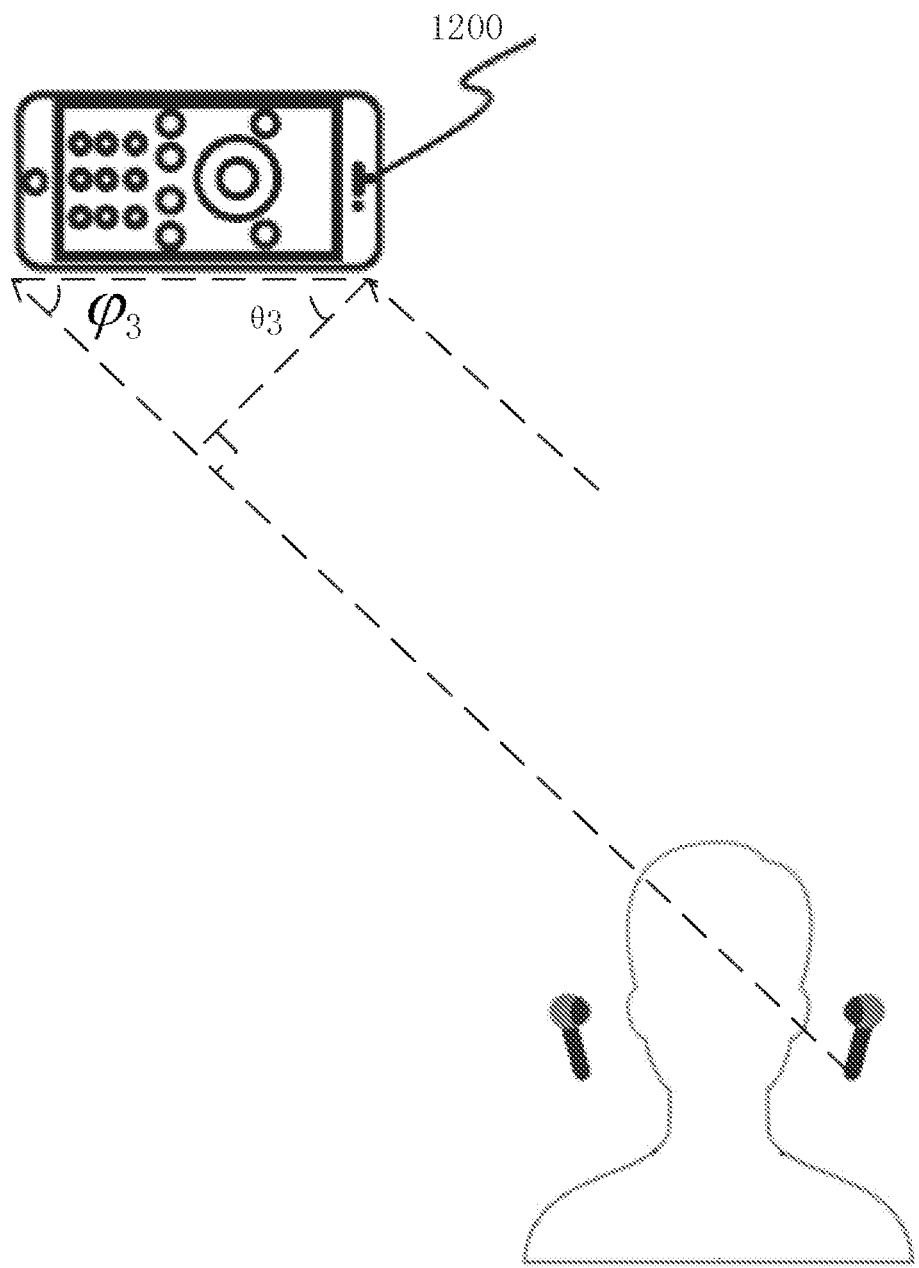
FIG. 23 illustrates a schematic diagram when a user wearing an intelligent earphone translates rightwards according to the present application.

When the user wearing the intelligent earphone translates rightwards, the intelligent device 1200 detects that the relative angle changes. FIG. 23 illustrates a schematic diagram when a user wearing an intelligent earphone translates rightwards according to the present application. As can be seen from FIG. 23, when the user wearing the intelligent earphone translates rightwards, the first sound detection module (such as microphone or microphone array) in the intelligent device 1200 and the second sound detection module (such as microphone or microphone array) in the intelligent device 1200 continue to respectively receive sound signals transmitted by the same intelligent earphone (such as the intelligent earphone worn on the right ear of the user illustrated in FIG. 23). Based on the method for determining the relative angle illustrated in FIG. 1, the intelligent device determines that the relative angle at this time is φ3. It can be seen that φ3 is less than φ1.

Therefore, by determining the change of the relative angle relative to the initial value (φ1), the intelligent device 1200 can determine the translation direction of the user wearing the intelligent earphone. Specifically, in a case that it is determined that the current relative angle is less than the initial value (φ1), it is determined that the user wearing the intelligent earphone translates rightwards; in a case that it is determined that the current relative angle is more than the initial value (φ1), it is determined that the user wearing the intelligent earphone translates leftwards.

For example (1), in a case that it is determined that the user wearing the intelligent earphone translates leftwards, the intelligent device 1200 may generate an instruction for switching to a previous song of a current song in a playlist. The song play resource in the intelligent device 1200 stops playing the current song and starts playing the previous song in the playlist in response to the instruction.

For example (2), in a case that it is determined that the user wearing the intelligent earphone translates rightwards, the intelligent device 1200 may generate an instruction for switching to a next song of a current song in a playlist. The song play resource in the intelligent device 1200 stops playing the current song and starts playing the next song in the playlist in response to the instruction.

For example (3), in a case that it is determined that the user wearing the intelligent earphone translates leftwards, the intelligent device 1200 may generate an instruction for switching to a next song of a current song in a playlist. The song play resource in the intelligent device 1200 stops playing the current song and starts playing the next song in the playlist in response to the instruction.

For example (4), in a case that it is determined that the user wearing the intelligent earphone translates rightwards, the intelligent device 1200 may generate an instruction for switching to a previous song of a current song in a playlist. The song play resource in the intelligent device 1200 stops playing the current song and starts playing the previous song in the playlist in response to the instruction.

In the above examples, the song is switched in an order according to the playlist, that is, the song jumps by one at each time. In fact, based on user settings, it is possible to make the song jump by more than one at each time, which is not limited in the embodiment of the present application.

Figure 24:
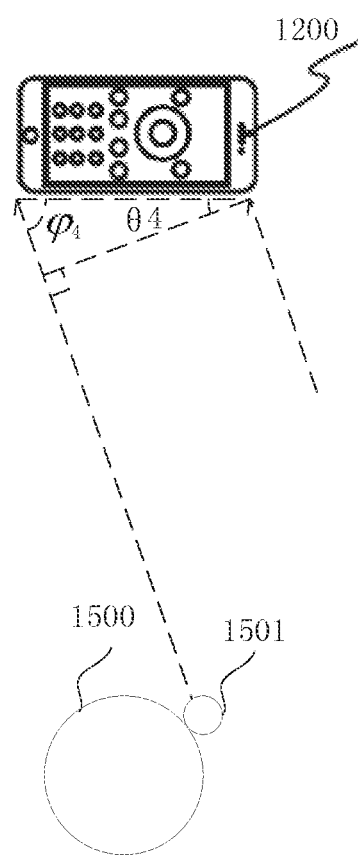
FIG. 24 illustrates a schematic diagram when a user wearing a wristband is located at an initial position according to the present application.

The present application will be described below by taking the wearable device being implemented as an intelligent wristband as an example. FIG. 24 illustrates a schematic diagram when a user wearing an intelligent wristband is located at an initial position according to the present application. It is assumed that the difference in signal arrival time is always the signal arrival time of the first sound detection module minus the signal arrival time of the second sound detection module. As can be seen from FIG. 24, at the initial position, when the user wearing the intelligent wristband 1500 containing a sound source 1501 (preferably ultrasonic sound source) faces the intelligent device 1200, the first sound detection module (such as microphone or microphone array) in the intelligent device 1200 and the second sound detection module (such as microphone or microphone array) in the intelligent device 1200 respectively receive sound signals (such as ultrasonic signals) transmitted by the sound source 1501. Based on the method for determining the relative angle illustrated in FIG. 1, the intelligent device 1200 determines that the relative angle at this time is $\varphi 4$.

Figure 25:
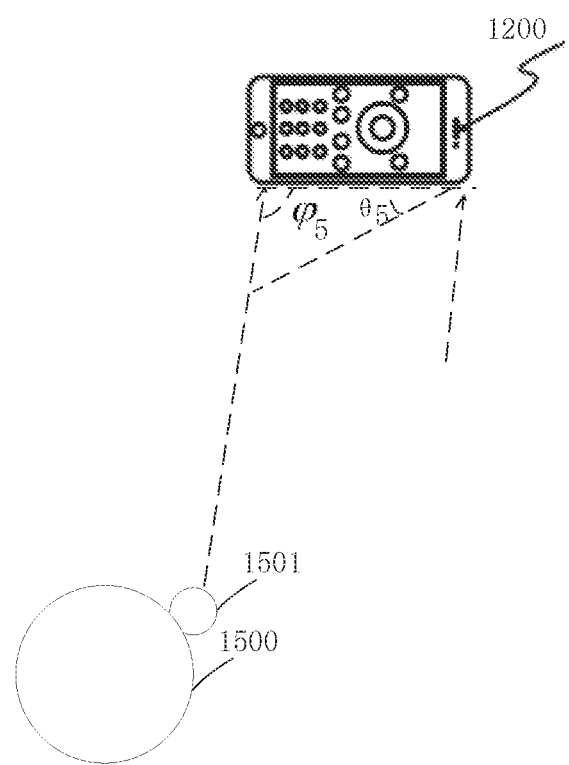
FIG. 25 illustrates a schematic diagram when a user wearing a wristband translates leftwards according to the present application.
Figure 26:
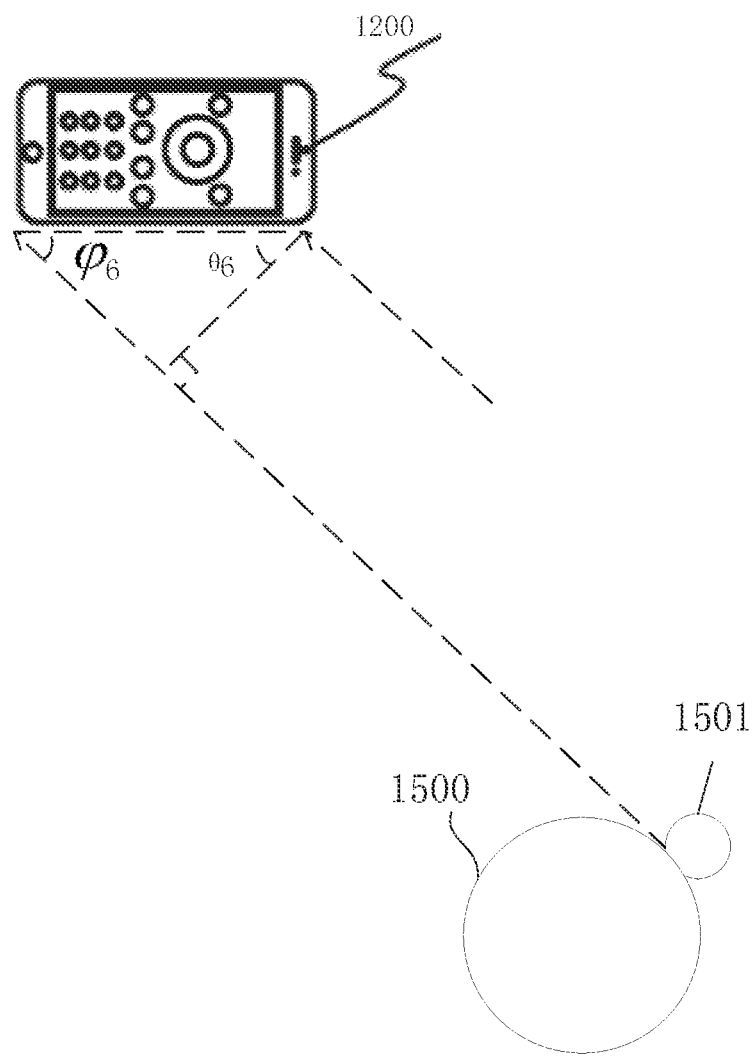
FIG. 26 illustrates a schematic diagram when a user wearing a wristband translates rightwards according to the present application.

When the user wearing the intelligent wristband 1500 translates leftwards, the intelligent device 1200 detects that the relative angle changes. FIG. 25 illustrates a schematic diagram when a user wearing an intelligent wristband translates leftwards according to the present application. As can be seen from FIG. 25, when the user wearing the intelligent wristband 1500 translates leftwards, the first sound detection module (such as microphone or microphone array) in the intelligent device 1200 and the second sound detection module (such as microphone or microphone array) in the intelligent device 1200 continue to respectively receive sound signals transmitted by the sound source 1501. Based on the method for determining the relative angle illustrated in FIG. 1, the intelligent device 1200 determines that the relative angle at this time is $\varphi 5$. It can be seen that $\varphi 5$ is more than $\varphi 4$. When the user wearing the intelligent wristband translates rightwards, the intelligent device 1200 detects that the relative angle changes. FIG. 26 illustrates a schematic diagram when a user wearing an intelligent wristband translates rightwards according to the present application. As can be seen from FIG. 26, when the user wearing the intelligent wristband 1500 translates rightwards, the first sound detection module (such as microphone or microphone array) in the intelligent device 1200 and the second sound detection module (such as microphone or microphone array) in the intelligent device 1200 continue to respectively receive sound signals transmitted by the sound source 1501. Based on the method for determining the relative angle illustrated in FIG. 1, the intelligent device 1200 determines that the relative angle at this time is $\varphi 6$. It can be seen that $\varphi 6$ is less than $\varphi 4$.

Therefore, by determining the change of the relative angle relative to the initial value ($\varphi 4$), the translation direction of the user wearing the intelligent wristband can be determined. Specifically, in a case that it is determined that the current relative angle is less than the initial value ($\varphi 4$), it is determined that the user wearing the intelligent wristband translates rightwards; in a case that it is determined that the current relative angle is more than the initial value ($\varphi 4$), it is determined that the user wearing the intelligent wristband translates leftwards.

For example (1), in a case that it is determined that the user wearing the intelligent wristband translates leftwards, the intelligent device 1200 may generate an instruction for switching to a previous song of a current song in a playlist. The song play resource in the intelligent device 1200 stops playing the current song and starts playing the previous song in the playlist in response to the instruction.

For example (2), in a case that it is determined that the user wearing the intelligent wristband translates rightwards, the intelligent device 1200 may generate an instruction for switching to a next song of a current song in a playlist. The song play resource in the intelligent device 1200 stops playing the current song and starts playing the next song in the playlist in response to the instruction.

For example (3), in a case that it is determined that the user wearing the intelligent wristband translates leftwards, the intelligent device 1200 may generate an instruction for switching to a next song of a current song in a playlist. The song play resource in the intelligent device 1200 stops playing the current song and starts playing the next song in the playlist in response to the instruction.

For example (4), in a case that it is determined that the user wearing the intelligent wristband translates rightwards, the intelligent device 1200 may generate an instruction for switching to a previous song of a current song in a playlist. The song play resource in the intelligent device 1200 stops playing the current song and starts playing the previous song in the playlist in response to the instruction.

Figure 27:
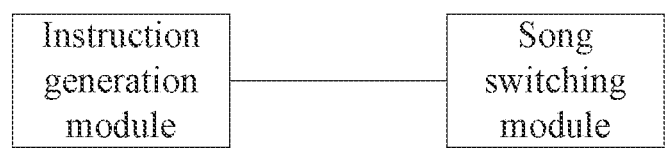
FIG. 27 illustrates a structural diagram of a second exemplary apparatus for switching a song according to the present application.

FIG. 27 illustrates a structural diagram of an apparatus for switching a song according to the present application. The apparatus includes: an instruction generation module configured to generate a song switching instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and a song switching module configured to execute a song switching operation in the intelligent device in response to the song switching instruction.

Exemplarily, the instruction generation module is configured to enable the first sound detection module in the intelligent device to detect a first sound signal directly reaching the first sound detection module from the wearable device, and enable the second sound detection module in the intelligent device to detect a second sound signal directly reaching the second sound detection module from the wearable device, wherein the first sound signal and the second sound signal are simultaneously transmitted by the wearable device; determine a time difference between a receiving time of the first sound signal and a receiving time of the second sound signal; and determine the relative angle based on a distance between the first sound detection module and the second sound detection module and the time difference. Exemplarily, the instruction generation module is configured to determine θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determine the relative angle q based on θ, where $$\varphi = \frac{\pi}{2} - \theta.$$

Exemplarily, the instruction generation module is configured to execute at least one of: generating an instruction for switching to a previous song of a current song in a case that the change corresponds to leftward movement of the wearable device relative to the intelligent device; generating an instruction for switching to a next song of a current song in a case that the change corresponds to rightward movement of the wearable device relative to the intelligent device; generating an instruction for switching to a next song of a current song in a case that the change corresponds to leftward movement of the wearable device relative to the intelligent device; and generating an instruction for switching to a previous song of a current song in a case that the change corresponds to rightward movement of the wearable device relative to the intelligent device.

An embodiment of the present application further provides an intelligent device, which includes: a first sound detection module; a second sound detection module; a control module configured to generate a song switching instruction in a case that it is determined that a relative angle between the intelligent device and a wearable device worn by a user changes, wherein the relative angle is determined based on respective detection operations performed by a first sound detection module and a second sound detection module contained in the intelligent device aiming at sound signals transmitted by the wearable device; and a song switching module configured to execute a song switching operation in the intelligent device in response to the song switching instruction. Exemplarily, the intelligent device includes an intelligent phone, a tablet computer, and so on.

The embodiment of the present application can also be applied in Virtual Reality (VR) house viewing. VR house viewing refers to viewing a house through a constructed virtual three-dimensional space of a house. At present, VR house viewing often only allows interaction with virtual three-dimensional spaces, such as clicking to navigate, or clicking to open and close. At present, when the user expects to change the view angle of browsing the house, the user usually needs to click on a preset point in the house to move to this point and display the house from the view angle at this point.

Based on the above description, the embodiment of the present application further provides a technical solution for virtually viewing a house based on the relative angle calculation method mentioned above.

VR house viewing can realize house viewing, house introduction or house showing in a virtual three-dimensional space, such as viewing, lecturing, or showing. Different from the current popular concept of picture-based house viewing, video-based house viewing, panorama-based house viewing and the like, which cannot provide in-depth information and real perception, "VR house viewing" refers to the use of VR technology to truly restore the three-dimensional scene of the house, providing consumers with immersive house viewing experience in a free mode, so that the user can experience the real house viewing scene without leaving the home. For example, by opening a VR house source on the APP and touching any position on the screen, the user can obtain in-depth information including the size, orientation, distance and the like of the real space of the house. In terms of restoring the three-dimensional scene of the house source, the user may firstly perform multi-point and multi-angle scanning and photographing on the house to obtain complete three-dimensional point cloud data, longitude and latitude data, and multi-exposure high-definition color photos. Later, through three-dimensional reconstruction technologies such as automatic modeling, intelligent hole filling, full-automatic data extraction and HDR optimization, all data and picture textures are mapped to the three-dimensional model to obtain the real house space finally seen by the user.

FIG. 28 illustrates a flowchart of a first exemplary method for virtually viewing a house according to the present application. The method may be executed by a wearable device. Referring to FIG. 28, the method includes step 2801 and step 2802. In step 2801, a view angle change instruction is generated in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device. In step 2802, the view angle change instruction is transmitted to the intelligent device, so that the intelligent device adjusts a view angle of a panoramic image showing a house in a display interface of the intelligent device based on the view angle change instruction. For example, the wearable device transmits the view angle change instruction to the intelligent device based on communication modes such as Bluetooth, infrared, ZigBee, and 4G/5G.

It can be seen that in the process of determining the relative angle, the wearable device in FIG. 28 is equivalent to the first intelligent device in the method illustrated in FIG. 1; the intelligent device containing a sound source in FIG. 28 is equivalent to the second intelligent device in the method illustrated in FIG. 1. Therefore, the embodiment of the present application can conveniently switch a view angle without requiring the user to perform a trigger operation on the display interface, thus providing a brand new virtual interactive music house viewing experience.

In an embodiment, determining the relative angle includes: detecting, by the first sound detection module in the wearable device, a first sound signal directly reaching the first sound detection module from the intelligent device, and detecting, by the second sound detection module in the wearable device, a second sound signal directly reaching the second sound detection module from the intelligent device, wherein the first sound signal and the second sound signal are simultaneously transmitted by the intelligent device; determining a time difference between a receiving time of the first sound signal and a receiving time of the second sound signal; and determining the relative angle based on a distance between the first sound detection module and the second sound detection module and the time difference. In an embodiment, determining the relative angle includes: determining θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determining the relative angle φ based on θ, where $$\varphi = \frac{\pi}{2} - \theta.$$

In an embodiment, generating a view angle change instruction includes at least one of: generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to leftward movement of the wearable device relative to the intelligent device; generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to rightward movement of the wearable device relative to the intelligent device; generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to leftward movement of the wearable device relative to the intelligent device; and generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to rightward movement of the wearable device relative to the intelligent device; and so on.

Figure 29:
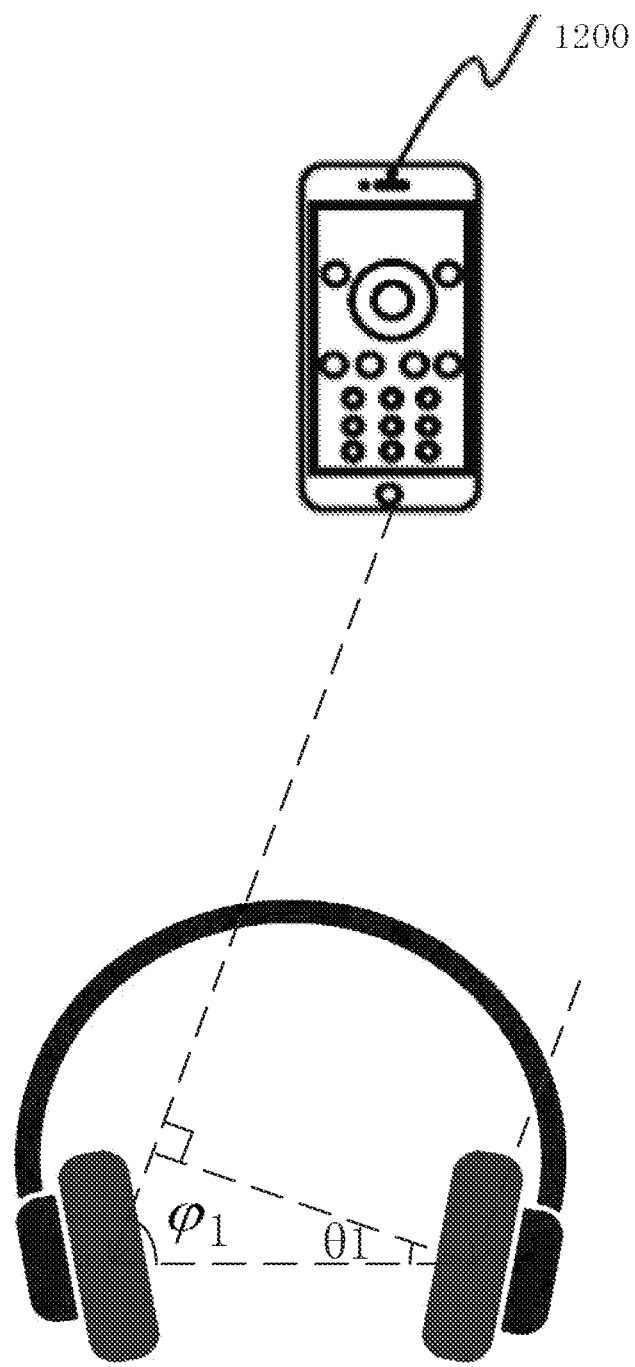
FIG. 29 illustrates a schematic diagram when a user wearing an intelligent earphone is located at an initial position according to the present application.

The present application will be described below by taking the wearable device being implemented as an intelligent earphone. FIG. 29 illustrates a schematic diagram when a user wearing an intelligent earphone is located at an initial position according to the present application. It is assumed that the difference in signal arrival time is the signal arrival time of the first sound detection module minus the signal arrival time of the second sound detection module. As can be seen from FIG. 29, at the initial position (for example, when the user wearing the intelligent earphone faces the intelligent device 1200), the first sound detection module (such as microphone or microphone array) in the left earphone of the intelligent earphone and the second sound detection module (such as microphone or microphone array) in the right earphone of the intelligent earphone respectively receive sound signals transmitted by the intelligent device 1200 (such as intelligent phone). Based on the method for determining the relative angle illustrated in FIG. 1, the intelligent earphone determines that the relative angle at this time is φ1.

Figure 30:
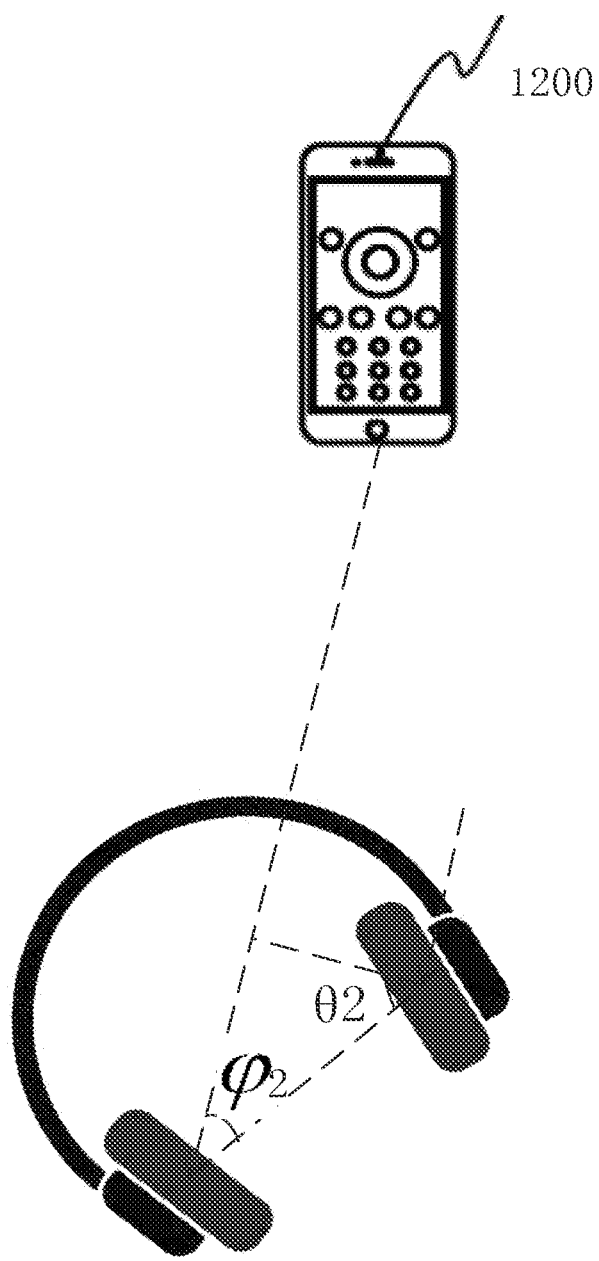
FIG. 30 illustrates a schematic diagram when a user wearing an intelligent earphone tilts the head leftwards.

When the user wearing the intelligent earphone moves leftwards (for example, when the user tilts the head leftwards or translates leftwards), the intelligent earphone detects that the relative angle changes. FIG. 30 illustrates a schematic diagram when a user wearing an intelligent earphone tilts the head leftwards. As can be seen from FIG. 30, when the user wearing the intelligent earphone tilts the head leftwards, the first sound detection module (such as microphone or microphone array) in the left earphone of the intelligent earphone and the second sound detection module (such as microphone or microphone array) in the right earphone of the intelligent earphone continue to respectively receive sound signals transmitted by the intelligent device 1200 (such as intelligent phone). Based on the method for determining the relative angle illustrated in FIG. 1, the intelligent earphone determines that the relative angle at this time is φ2. It can be seen that φ2 is less than φ1. Similarly, the relative angle also decreases when the intelligent earphone translates rightwards.

Figure 31:
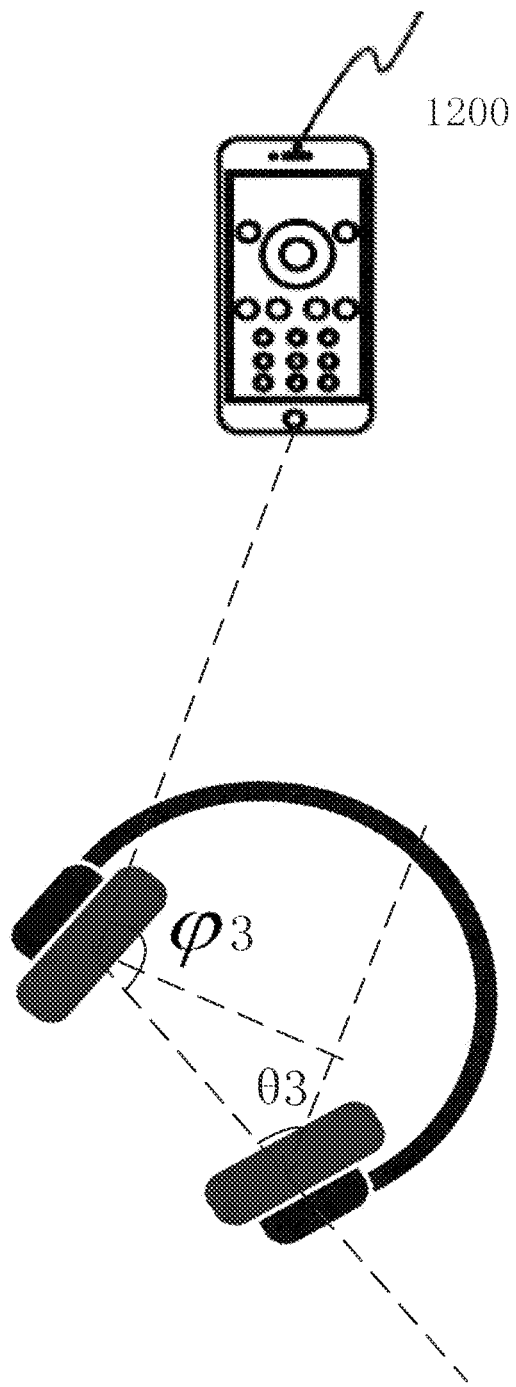
FIG. 31 illustrates a schematic diagram when a user wearing an intelligent earphone tilts the head rightwards.

When the user wearing the intelligent earphone moves rightwards (for example, when the user tilts the head rightwards or translates rightwards), the intelligent earphone detects that the relative angle changes. FIG. 31 illustrates a schematic diagram when a user wearing an intelligent earphone tilts the head rightwards. As can be seen from FIG. 31, when the user wearing the intelligent earphone tilts the head rightwards, the first sound detection module (such as microphone or microphone array) in the left earphone of the intelligent earphone and the second sound detection module (such as microphone or microphone array) in the right earphone of the intelligent earphone continue to respectively receive sound signals transmitted by the intelligent device 1200 (such as intelligent phone). Based on the method for determining the relative angle illustrated in FIG. 1, the intelligent earphone determines that the relative angle at this time is φ3. It can be seen that φ3 is more than φ1. Similarly, the relative angle also increases when the intelligent earphone translates rightwards.

Therefore, by determining the change of the relative angle relative to the initial value (φ1), the head tilting direction of the user wearing the intelligent earphone can be determined. Specifically, in a case that it is determined that the current relative angle is less than the initial value (φ1), it is determined that the user wearing the intelligent earphone tilts the head leftwards; in a case that it is determined that the current relative angle is more than the initial value (φ1), it is determined that the user wearing the intelligent earphone moves rightwards (for example, the user tilts the head).

For example (1), in a case that it is determined that the user wearing the intelligent earphone moves leftwards, the intelligent earphone may generate a view angle change instruction for leftwards moving a view angle of a panoramic image by a fixed angle (such as 30 degrees). The intelligent device leftwards moves the view angle of the panoramic image showing the house in the display interface of the intelligent device by the fixed angle based on the view angle change instruction. Exemplarily, the change of the distance between the intelligent earphone and the intelligent device is further detected (such as by ultrasonic ranging), and an instruction for moving backwards/forwards in the room is generated. The intelligent device executes the instruction for moving backwards/forwards to show the content that the user will see when moving backwards/forwards in the scene.

For example (2), in a case that it is determined that the user wearing the intelligent earphone moves leftwards, the intelligent earphone may generate a view angle change instruction for leftwards moving a view angle of a panoramic image by an angle related to a change amount of the change (i.e., a difference between the current relative angle and the relative angle at the initial position). For example, the correlation may be a direct proportion relationship. For example, in a case that it is determined that the difference between the current relative angle and the relative angle at the initial position is A1, a view angle change instruction for leftwards moving the view angle of the panoramic image by an angle of K*A1 (where K is a predetermined coefficient) may be generated. The intelligent device leftwards moves the view angle of the panoramic image showing the house in the display interface of the intelligent device by the angle of K*A1 based on the view angle change instruction. Exemplarily, the change of the distance between the intelligent earphone and the intelligent device is further detected, and an instruction for moving backwards/forwards in the room is generated. The intelligent device executes the instruction for moving backwards/forwards to show the content that the user will see when moving backwards/forwards in the scene.

For example (3), in a case that it is determined that the user wearing the intelligent earphone moves leftwards, the intelligent earphone generates an instruction for leftwards moving to a predetermined point in the panoramic image. The intelligent device leftwards moves to the predetermined point in the panoramic image based on the view angle change instruction, so that it can change both the position in the panoramic image and the view angle of the panoramic image by moving to the predetermined point.

It can be seen that turning right/left in the scene is achieved by increasing/decreasing the relative angle; moving backwards/forwards in the scene is achieved by increasing/decreasing the distance between intelligent devices, thus providing the customer with a realistic and convenient viewing experience, making it feel like the customer is moving freely in the room, maintaining a logical sense of spatial path and providing an immersive experience. In example (1) to example (3), a view angle change instruction in a direction as the same as the direction towards which the head of the user tilts is generated. Exemplarily, it is also possible to generate a view angle change instruction in a direction opposite to the direction towards which the head of the user tilts, thus achieving a user experience of direction reversal. The implementation process of the embodiment of the present application will be described below in detail. The implementation process includes the following steps: in step S01, an intelligent device of a user transmits a positioning signal in ultrasonic format, the positioning signal containing a unique identifier (such as Mac address/ID) of the intelligent device and being a signal based on CDMA technology architecture. In step S02, a wearable device worn by the user detects the positioning signal, parses the identifier from the detected positioning signal, and confirms based on the identifier that the detected positioning signal originates from the same sound source. In step S03, the wearable device calculates a relative angle between the wearable device and the intelligent device through a method for positioning the intelligent device, and calculates a relative distance between the wearable device and the intelligent device through ultrasonic ranging. In step S04, the intelligent device remains stationary and the head or body of the user moves; when the relative angle increases, it indicates that the head or body of the user moves rightwards and the picture rotates rightwards; when the relative angle decreases, it indicates that the head or body of the user moves leftwards and the picture rotates leftwards; when the relative distance decreases, it indicates that the head or body moves forwards, and the picture shows what the user will see as the user moves forwards in the scene; when the relative distance increases, it indicates that the head or body of the user moves backwards, and the picture shows what the user will see when the user moves backwards in the scene. In step S05, if the user needs to maintain a view angle of a scene, the user transmits a view angle locking instruction, and the intelligent device acquires the view angle locking instruction and locks the picture viewed at the current view angle according to the view angle locking instruction; when the head or body of the user moves, it will not cause a change in the view angle of the scene, thus maintaining the content at the same view angle of the viewed picture, so that user can move while viewing the picture without influencing the viewed picture; in addition, according to an unlocking instruction and after receiving the unlocking instruction, the viewed picture at the view angle is no longer locked, and the intelligent device changes the view angle of the picture according to the movement of the user.

It is assumed that Xiaoming is visiting a certain house using VR house viewing software and is located at an entrance. It is assumed that Xiaoming is wearing intelligent earphone and using an intelligent phone to view the room. The specific process includes the following steps: in step S01, the intelligent phone transmits a positioning signal in ultrasonic format, the positioning signal containing a unique identifier (such as Mac address/ID) of the intelligent phone and being a signal based on CDMA technology architecture. In step S02, the intelligent earphone detects the positioning signal, parses the identifier from the detected positioning signal, and confirms that the detected positioning signal originates from the same sound source based on the identifier. In step S03, the intelligent earphone calculates a relative angle between the intelligent earphone and the intelligent phone, and calculates a relative distance between the intelligent earphone and the intelligent phone through ultrasonic ranging. In step S04, the intelligent phone remains stationary; if the upper body of Xiaoming tilts rightwards (that is, the relative angle between the intelligent earphone and the intelligent phone increases), the picture will rotate rightwards and show the scene on the left side of the entrance; if the upper body of Xiaoming tilts leftwards (that is, the relative angle between the intelligent earphone and intelligent phone decreases), the picture will rotate leftwards and show the scene on the right side of the entrance; if Xiaoming moves forwards to approach the intelligent phone (that is, the relative distance between the intelligent earphone and the intelligent phone decreases), it indicates that Xiaoming moves forwards and enters the house from the entrance; if Xiaoming leans back (that is, the relative distance between the intelligent earphone and the intelligent phone increases), it indicates that Xiaoming moves backwards and exits the house. In step S05: if Xiaoming needs to maintain the view angle of the balcony or wants a comfortable posture, Xiaoming may say "lock the picture"; the intelligent phone receives the voice information of Xiaoming, determines that the voice information is voice information for locking the view angle, and then generates a view angle locking instruction; according to the view angle locking instruction, the balcony picture viewed at the current view angle is locked, so that Xiaoming can move while viewing the balcony without influencing the viewed picture; when Xiaoming wants to view other places, Xiaoming may say 'unlock the picture'; the intelligent phone receives the voice information of Xiaoming, determines that the voice information is voice information for unlocking the view angle, and then generates an unlocking instruction; according to the unlocking instruction, the balcony picture viewed at the current view angle is no longer locked, and the view angle of viewing the house changes with the movement of the head or body of Xiaoming.

FIG. 32 illustrates a structural diagram of a first exemplary apparatus for virtually viewing a house according to the present application. The apparatus includes: an instruction generation module configured to generate a view angle change instruction in a case that it is determined that a relative angle between a wearable device worn by a user and an intelligent device changes, wherein the relative angle is determined based on respective detection operations performed by a first sound detection module and a second sound detection module contained in the wearable device aiming at sound signals transmitted by the intelligent device; and an instruction transmitting module configured to adjust a view angle of a panoramic image showing a house in a display interface of the intelligent device based on the view angle change instruction. In an embodiment, the instruction generation module is configured to enable the first sound detection module in the wearable device to detect a first sound signal directly reaching the first sound detection module from the intelligent device, and enable the second sound detection module in the wearable device to detect a second sound signal directly reaching the second sound detection module from the intelligent device, wherein the first sound signal and the second sound signal are simultaneously transmitted by the intelligent device; determine a time difference between a receiving time of the first sound signal and a receiving time of the second sound signal; and determine the relative angle based on a distance between the first sound detection module and the second sound detection module and the time difference. In an embodiment, the instruction generation module is configured to determine θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determine the relative angle φ based on θ, where $$\varphi = \frac{\pi}{2} - \theta.$$

In an embodiment, the instruction generation module is configured to execute at least one of: generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to leftward movement of the wearable device relative to the intelligent device; generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to rightward movement of the wearable device relative to the intelligent device; generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to leftward movement of the wearable device relative to the intelligent device; generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to rightward movement of the wearable device relative to the intelligent device; and so on.

An embodiment of the present application further provides a wearable device, which includes: a first sound detection module; a second sound detection module; a control module configured to generate a view angle change instruction in a case that it is determined that a relative angle between a wearable device and an intelligent device changes, wherein the relative angle is determined based on respective detection operations performed by the first sound detection module and the second sound detection module aiming at sound signals transmitted by the intelligent device; and a communication module configured to transmit the view angle change instruction to the intelligent device, so that the intelligent device adjusts a view angle of a panoramic image showing a house in a display interface of the intelligent device based on the view angle change instruction. Exemplarily, the wearable device may include an intelligent earphone, intelligent glasses, an intelligent watch, an intelligent wristband, and so on.

FIG. 33 illustrates a flowchart of a second exemplary method for virtually viewing a house according to the present application. The method may be executed by an intelligent device. Referring to FIG. 33, the method includes step 3301 and step 3302. In step 3301, a view angle change instruction is generated in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device. In step 3302, a view angle of a panoramic image showing a house in a display interface of the intelligent device is adjusted based on the view angle change instruction.

It can be seen that in the process of determining the relative angle, the intelligent device in FIG. 33 is equivalent to the first intelligent device in the method illustrated in FIG. 1; the wearable device containing a sound source in FIG. 33 is equivalent to the second intelligent device in the method illustrated in FIG. 1. Therefore, the embodiment of the present application can conveniently switch a view angle without requiring the user to perform a trigger operation on the display interface, thus providing a brand new virtual interactive music house viewing experience.

In an embodiment, determining the relative angle includes: detecting, by the first sound detection module in the intelligent device, a first sound signal directly reaching the first sound detection module from the wearable device, and detecting, by the second sound detection module in the intelligent device, a second sound signal directly reaching the second sound detection module from the wearable device, wherein the first sound signal and the second sound signal are simultaneously transmitted by the wearable device; determining a time difference between a receiving time of the first sound signal and a receiving time of the second sound signal; and determining the relative angle based on a distance between the first sound detection module and the second sound detection module and the time difference. In an embodiment, determining the relative angle includes: determining θ based on $$\theta = \arcsin\left(\frac{d}{D}\right).$$

where arcsin is an arcsin function, d=t*c, t is the time difference, c is the propagation speed of sound, and D is the distance between the first sound detection module and the second sound detection module; and determining the relative angle φ based on θ, where $$\varphi = \frac{\pi}{2} - \theta.$$

In an embodiment, generating a view angle change instruction includes at least one of: generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to leftward movement of the wearable device relative to the intelligent device; generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to rightward movement of the wearable device relative to the intelligent device; generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to leftward movement of the wearable device relative to the intelligent device; generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to rightward movement of the wearable device relative to the intelligent device; and so on.

Figure 34:
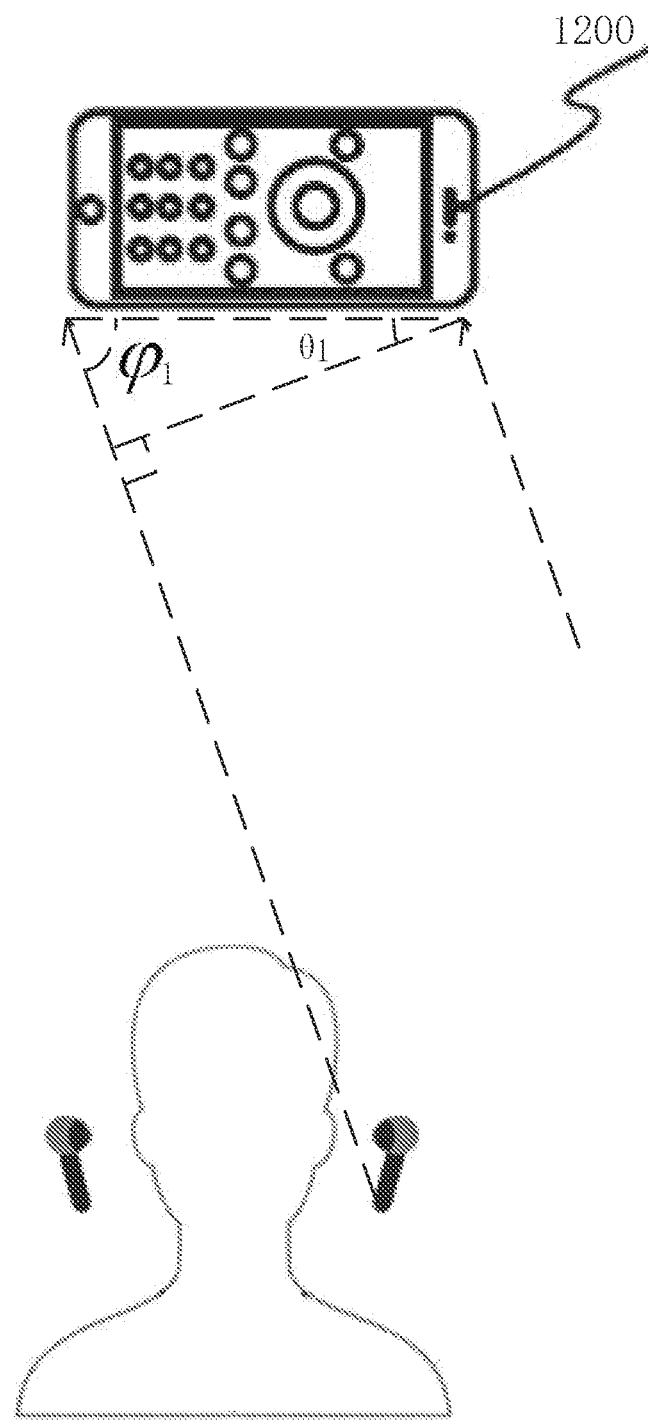
FIG. 34 illustrates a schematic diagram when a user wearing an intelligent earphone is located at an initial position.

The present application will be described below by taking the wearable device being implemented as an intelligent earphone. FIG. 34 illustrates a schematic diagram when a user wearing an intelligent earphone is located at an initial position according to the present application. It is assumed that the difference in signal arrival time is always the signal arrival time of the first sound detection module minus the signal arrival time of the second sound detection module. As can be seen from FIG. 34, at the initial position (for example, when the user wearing the intelligent earphone faces the intelligent device 1200), the first sound detection module (such as microphone or microphone array) in the intelligent device 1200 and the second sound detection module (such as microphone or microphone array) in the intelligent device 1200 respectively receive sound signals transmitted by the intelligent earphone (such as intelligent earphone worn on a right ear of the user illustrated in FIG. 34). Based on the method for determining the relative angle illustrated in FIG. 1, the intelligent device 1200 determines that the relative angle at this time is φ1.

Figure 35:
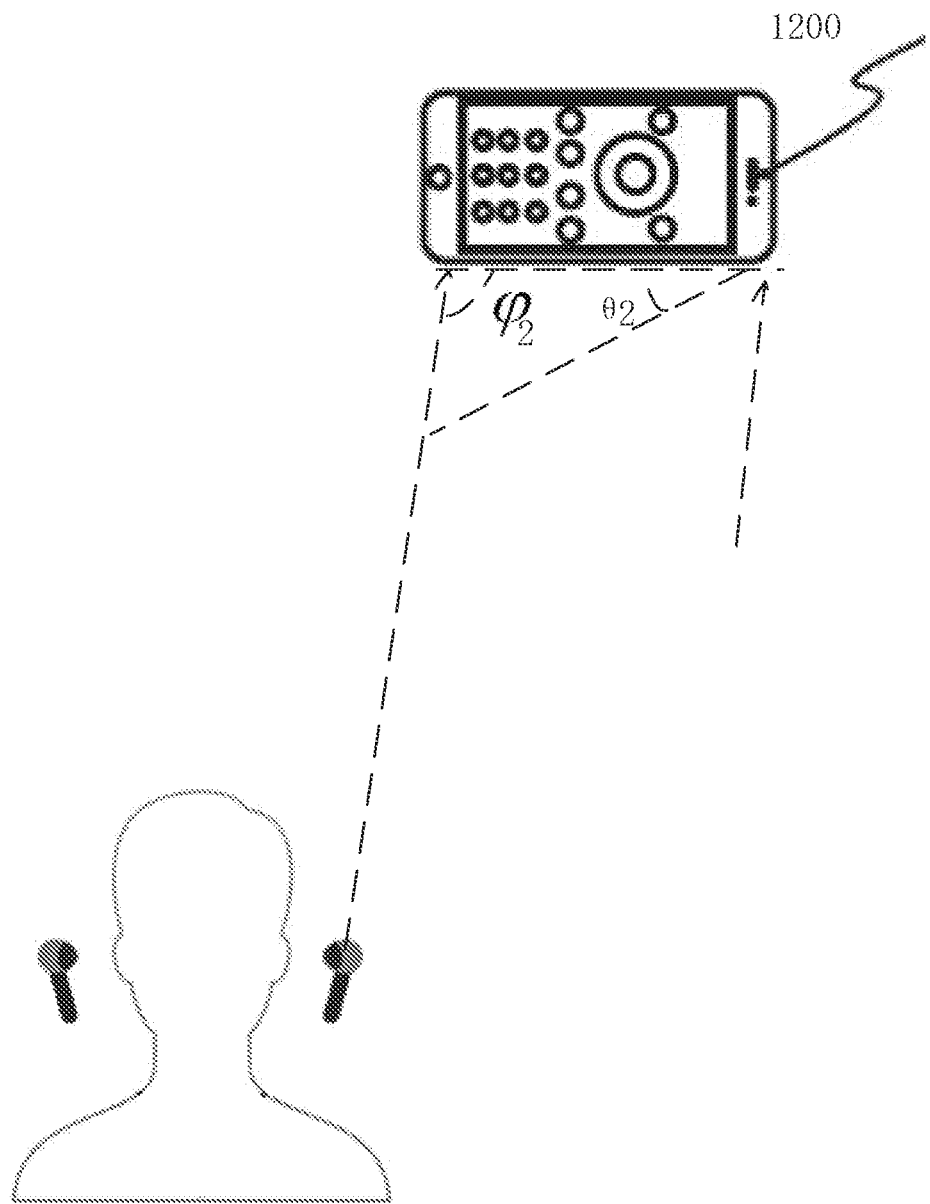
FIG. 35 illustrates a schematic diagram when a user wearing an intelligent earphone translates leftwards.

When the user wearing the intelligent earphone translates leftwards, the intelligent earphone detects that the relative angle changes. FIG. 35 illustrates a schematic diagram when a user wearing an intelligent earphone translates leftwards. As can be seen from FIG. 35, when the user wearing the intelligent earphone translates leftwards, the first sound detection module (such as microphone or microphone array) in the intelligent device 1200 and the second sound detection module (such as microphone or microphone array) in the intelligent device 1200 continue to respectively receive sound signals transmitted by the same intelligent earphone (such as intelligent earphone worn on a right ear of the user illustrated in FIG. 35). Based on the method for determining the relative angle illustrated in FIG. 1, the intelligent earphone determines that the relative angle at this time is φ2. It can be seen that φ2 is more than φ1.

Figure 36:
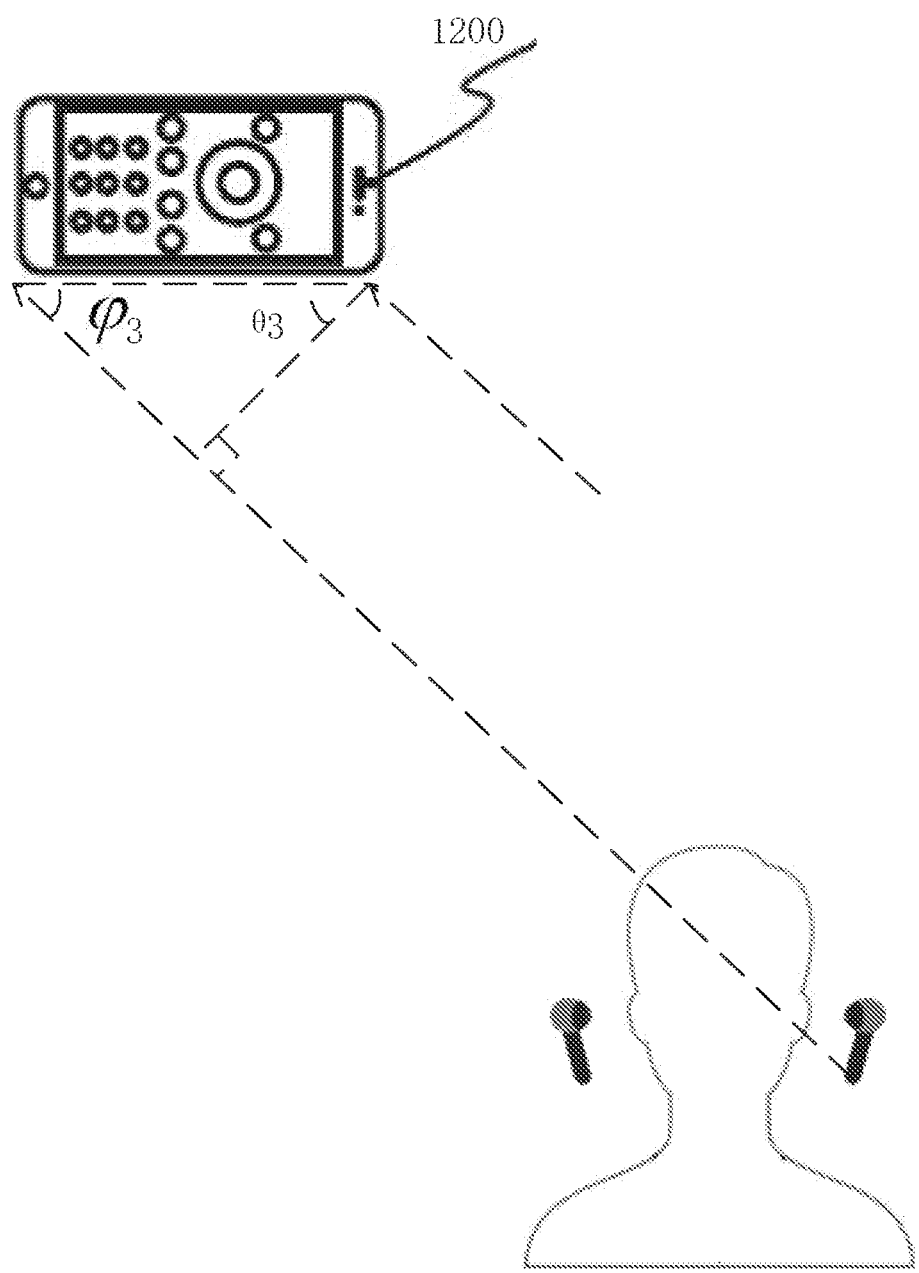
FIG. 36 illustrates a schematic diagram when a user wearing an intelligent earphone translates rightwards.

When the user wearing the intelligent earphone translates rightwards, the intelligent earphone detects that the relative angle changes. FIG. 36 illustrates a schematic diagram when a user wearing an intelligent earphone translates rightwards. As can be seen from FIG. 36, when the user wearing the intelligent earphone translates rightwards, the first sound detection module (such as microphone or microphone array) in the intelligent device 1200 and the second sound detection module (such as microphone or microphone array) in the intelligent device 1200 continue to respectively receive sound signals transmitted by the same intelligent earphone (such as intelligent earphone worn on a right ear of the user illustrated in FIG. 36). Based on the method for determining the relative angle illustrated in FIG. 1, the intelligent earphone determines that the relative angle at this time is φ3. It can be seen that φ3 is less than φ1.

Therefore, by determining the change of the relative angle relative to the initial value (φ1), the translation direction of the user wearing the intelligent earphone can be determined. Specifically, in a case that it is determined that the current relative angle is less than the initial value (φ1), it is determined that the user wearing the intelligent earphone translates rightwards; in a case that it is determined that the current relative angle is more than the initial value (φ1), it is determined that the user wearing the intelligent earphone translates leftwards.

For example (1), in a case that it is determined that the user wearing the intelligent earphone translates leftwards, the intelligent earphone may generate a view angle change instruction for leftwards moving a view angle of a panoramic image by a fixed angle (such as 30 degrees). The intelligent device leftwards moves the view angle of the panoramic image showing the house in the display interface of the intelligent device by the fixed angle based on the view angle change instruction. Exemplarily, the change of the distance between the intelligent earphone and the intelligent device is further detected (such as by ultrasonic ranging), and an instruction for moving backwards/forwards in the room is generated. The intelligent device executes the instruction for moving backwards/forwards to show the content that the user will see when moving backwards/forwards in the scene.

For example (2), in a case that it is determined that the user wearing the intelligent earphone translates leftwards, the intelligent earphone may generate a view angle change instruction for leftwards moving a view angle of a panoramic image by an angle related to a change amount of the change (i.e., a difference between the current relative angle and the relative angle at the initial position). For example, the correlation may be a direct proportion relationship. For example, in a case that it is determined that the difference between the current relative angle and the relative angle at the initial position is A1, a view angle change instruction for leftwards moving the view angle of the panoramic image by an angle of K*A1 (where K is a predetermined coefficient) may be generated. The intelligent device leftwards moves the view angle of the panoramic image showing the house in the display interface of the intelligent device by the angle of K*A1 based on the view angle change instruction. Exemplarily, the change of the distance between the intelligent earphone and the intelligent device is further detected, and an instruction for moving backwards/forwards in the room is generated. The intelligent device executes the instruction for moving backwards/forwards to show the content that the user will see when moving backwards/forwards in the scene.

For example (3), in a case that it is determined that the user wearing the intelligent earphone moves leftwards, the intelligent earphone generates an instruction for leftwards moving to a predetermined point in the panoramic image. The intelligent device leftwards moves to the predetermined point in the panoramic image based on the view angle change instruction, so that it can change both the position in the panoramic image and the view angle of the panoramic image by moving to the predetermined point.

It can be seen that turning right/left in the scene is achieved by increasing/decreasing the relative angle; moving backwards/forwards in the scene is achieved by increasing/decreasing the distance between intelligent devices, thus providing the customer with a realistic and convenient viewing experience, making it feel like the customer is moving freely in the room, maintaining a logical sense of spatial path and providing an immersive experience. In example (1) to example (3), a view angle change instruction in a direction as the same as the direction towards which the user translates is generated. Exemplarily, it is also possible to generate a view angle change instruction in a direction opposite to the direction towards which the user translates, thus achieving a user experience of direction reversal.

The implementation process of the embodiment of the present application will be described below in detail. The implementation process includes the following steps: in step S01, a wearable device of a user transmits a positioning signal in ultrasonic format, the positioning signal containing a unique identifier (such as Mac address/ID) of the wearable device and being a signal based on CDMA technology architecture. In step S02, an intelligent device containing two sound detection modules respectively detects the positioning signal, parses the identifier from the detected positioning signal, and confirms based on the identifier that the detected positioning signal originates from the same sound source. In step S03, the intelligent device calculates a relative angle between the intelligent device and the wearable device, and calculates a relative distance between the intelligent device and the wearable device through ultrasonic ranging. In step S04, the intelligent device remains stationary and the head or body of the user moves; when the relative angle increases, it indicates that the head or body of the user moves leftwards and the picture rotates leftwards; when the relative angle decreases, it indicates that the head or body of the user moves rightwards and the picture rotates rightwards; when the relative distance decreases, it indicates that the head or body moves forwards, and the picture shows what the user will see as the user moves forwards in the scene; when the relative distance increases, it indicates that the head or body of the user moves backwards, and the picture shows what the user will see when the user moves backwards in the scene. In step S05, if the user needs to maintain a view angle of a scene, the user transmits a view angle locking instruction, and the intelligent device acquires the view angle locking instruction and locks the picture viewed at the current view angle according to the view angle locking instruction; when the head or body of the user moves, it will not cause a change in the view angle of the scene, thus maintaining the content at the same view angle of the viewed picture, so that user can move while viewing the picture without influencing the viewed picture; in addition, according to an unlocking instruction and after receiving the unlocking instruction, the viewed picture at the view angle is no longer locked, and the intelligent device changes the view angle of the picture according to the movement of the user.

It is assumed that Xiaoming is visiting a certain house using VR house viewing software and is located at an entrance. It is assumed that Xiaoming is wearing intelligent earphone and using an intelligent phone to view the room. The specific process includes the following steps: in step S01, the intelligent earphone transmits a positioning signal in ultrasonic format, the positioning signal containing a unique identifier (such as Mac address/ID) of the intelligent phone and being a signal based on CDMA technology architecture. In step S02, the intelligent phone detects the positioning signal, parses the identifier from the detected positioning signal, and confirms that the detected positioning signal originates from the same sound source based on the identifier. In step S03, the intelligent phone calculates a relative angle between the intelligent phone and the intelligent earphone, and calculates a relative distance between the intelligent phone and the intelligent earphone through ultrasonic ranging. In step S04, the intelligent phone remains stationary; if Xiaoming translates rightwards (that is, the relative angle between the intelligent phone and the intelligent earphone decreases), the picture will rotate rightwards and show the scene on the left side of the entrance; if the upper body of Xiaoming translates leftwards (that is, the relative angle between the intelligent earphone and intelligent phone increases), the picture will rotate leftwards and show the scene on the right side of the entrance; if Xiaoming moves forwards to approach the intelligent phone (that is, the relative distance between the intelligent earphone and the intelligent phone decreases), it indicates that Xiaoming moves forwards and enters the house from the entrance; if Xiaoming leans back (that is, the relative distance between the intelligent earphone and the intelligent phone increases), it indicates that Xiaoming moves backwards and exits the house. In step S05: if Xiaoming needs to maintain the view angle of the balcony or wants a comfortable posture, Xiaoming may say "lock the picture"; the intelligent phone receives the voice information of Xiaoming, determines that the voice information is voice information for locking the view angle, and then generates a view angle locking instruction; according to the view angle locking instruction, the balcony picture viewed at the current view angle is locked, so that Xiaoming can move while viewing the balcony without influencing the viewed picture; when Xiaoming wants to view other places, Xiaoming may say 'unlock the picture'; the intelligent phone receives the voice information of Xiaoming, determines that the voice information is voice information for unlocking the view angle, and then generates an unlocking instruction; according to the unlocking instruction, the balcony picture viewed at the current view angle is no longer locked, and the view angle of viewing the house changes with the movement of the head or body of Xiaoming.

Figure 37:
FIG. 37 illustrates a structural diagram of a second exemplary apparatus for virtually viewing a house according to the present application.

FIG. 37 illustrates a structural diagram of an apparatus for virtually viewing a house according to the present application. The apparatus includes: an instruction generation module configured to generate a view angle change instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and a view angle adjustment module configured to adjust a view angle of a panoramic image showing a house in a display interface of the intelligent device based on the view angle change instruction. In an embodiment, the instruction generation module is configured to enable the first sound detection module in the intelligent device to detect a first sound signal directly reaching the first sound detection module from the wearable device, and enable the second sound detection module in the intelligent device to detect a second sound signal directly reaching the second sound detection module from the wearable device, wherein the first sound signal and the second sound signal are simultaneously transmitted by the wearable device; determine a time difference between a receiving time of the first sound signal and a receiving time of the second sound signal; and determine the relative angle based on a distance between the first sound detection module and the second sound detection module and the time difference. In an embodiment, the instruction generation module is configured to determine θ based on $$\theta = \arcsin\left(\frac{d}{D}\right),$$

where arcsin is an arcsin function, d=t*c, t is the time difference, c is the propagation speed of sound, and D is the distance between the first sound detection module and the second sound detection module; and determine the relative angle φ based on θ, where $$\varphi = \frac{\pi}{2} - \theta.$$

In an embodiment, the instruction generation module is configured to execute at least one of: generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to leftward movement of the wearable device relative to the intelligent device; generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to rightward movement of the wearable device relative to the intelligent device; generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to leftward movement of the wearable device relative to the intelligent device; generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to rightward movement of the wearable device relative to the intelligent device; and so on.

An embodiment of the present application further provides an intelligent device, which includes: a first sound detection module; a second sound detection module; a control module configured to generate a view angle change instruction in a case that it is determined that a relative angle between an intelligent device and a wearable device worn by a user changes, wherein the relative angle is determined based on respective detection operations performed by a first sound detection module and a second sound detection module contained in the intelligent device aiming at sound signals transmitted by the wearable device; and a view angle adjustment module configured to adjust a view angle of a panoramic image showing a house in a display interface of the intelligent device based on the view angle change instruction. Exemplarily, the intelligent device includes an intelligent phone, a tablet computer, and so on.

An embodiment of the present application further provides a computer-readable storage medium, on which a computer program is stored. When the computer program is executed by the processor, the various processes implemented in the above embodiments of the present application can be implemented, and the same technical effect can be achieved. To avoid repetition, it will not be repeated here.

The embodiments of the present application have been described above with reference to the drawings. However, the present application is not limited to the specific embodiments mentioned above. The specific embodiments mentioned above are only exemplary and not restrictive. Under the inspiration of the present application, those skilled in the art may make various modifications without departing from the essence of the present application and the scope of protection of the claims, which, however, still fall within the scope of protection of the present application.

The invention claimed is:

1. A method for generating a control instruction, wherein the method for generating a control instruction comprises:
    generating a control instruction in a case that it is determined that a relative angle between a wearable device worn by a user and an intelligent device changes, wherein the relative angle is determined based on a first sound signal and a second sound signal obtained from respective detection operations performed by a first sound detection module and a second sound detection module contained in the wearable device aiming at sound signals transmitted by the intelligent device; and
    transmitting the control instruction to the intelligent device, so that the intelligent device executes the control instruction;
    wherein the first sound signal and the second sound signal are determined by
    determining sound signals with an intensity more than a predetermined threshold in a sound signal stream transmitted by the intelligent device and detected by the first sound detection module to form a first candidate signal set;

determining sound signals with an intensity more than the predetermined threshold in the sound signal stream transmitted by the intelligent device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

2. The method for generating a control instruction according to claim 1, wherein the control instruction comprises at least one of an instruction for switching a picture, an instruction for switching an article, an instruction for switching a video, an instruction for switching an audio, an instruction for switching an email, an instruction for switching a view angle, and an instruction for switching an interface; and wherein the first sound signal and the second sound signal are ultrasonic waves in code division multiple access (CDMA) format and contain a media access control (MAC) address of the intelligent device.

3. A non-transitory computer-readable storage medium, wherein a computer-readable instruction is stored in the computer-readable storage medium, and the computer-readable instruction is used for executing the method for generating a control instruction according to claim 1.

4. An apparatus for generating a control instruction, wherein the apparatus for generating a control instruction comprises:

a generation module configured to generate a control instruction in a case that it is determined that a relative angle between a wearable device worn by a user and an intelligent device changes, wherein the relative angle is determined based on a first sound signal and a second sound signal obtained from respective detection operations performed by a first sound detection module and a second sound detection module contained in the wearable device aiming at sound signals transmitted by the intelligent device; and a transmitting module configured to transmit the control instruction to the intelligent device, so that the intelligent device executes the control instruction;

wherein the first sound signal and the second sound signal are determined by determining sound signals with an intensity more than a predetermined threshold in a sound signal stream transmitted by the intelligent device and detected by the first sound detection module to form a first candidate signal set;

determining sound signals with an intensity more than the predetermined threshold in the sound signal stream transmitted by the intelligent device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

5. A method for generating a control instruction, wherein the method for generating a control instruction comprises:

generating a control instruction in a case that it is determined that a relative angle between an intelligent device and a wearable device worn by a user changes, wherein the relative angle is determined based on a first sound signal and a second sound signal obtained from respective detection operations performed by a first sound detection module and a second sound detection module contained in the intelligent device aiming at sound signals transmitted by the wearable device; and executing an operation corresponding to the control instruction in the intelligent device in response to the control instruction;

wherein the first sound signal and the second sound signal are determined by determining sound signals with an intensity more than a predetermined threshold in a sound signal stream transmitted by the wearable device and detected by the first sound detection module to form a first candidate signal set;

determining sound signals with an intensity more than the predetermined threshold in the sound signal stream transmitted by the wearable device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

6. The method for generating a control instruction according to claim 5, wherein the control instruction comprises at least one of an instruction for switching a picture, an instruction for switching an article, an instruction for switching a video, an instruction for switching an audio, an instruction for switching an email, an instruction for switching a view angle, and an instruction for switching an interface; and wherein the first sound signal and the second sound signal are ultrasonic waves in code division multiple access (CDMA) format and contain a media access control (MAC) address of the intelligent device.

7. An apparatus for generating a control instruction, wherein the apparatus for generating a control instruction comprises:

a generation module configured to generate a control instruction in a case that it is determined that a relative angle between an intelligent device and a wearable device worn by a user changes, wherein the relative angle is determined based on a first sound signal and a second sound signal obtained from respective detection operations performed by a first sound detection module and a second sound detection module contained in the intelligent device aiming at sound signals transmitted by the wearable device; and an execution module configured to execute an operation corresponding to the control instruction in the intelligent device in response to the control instruction;

wherein the first sound signal and the second sound signal are determined by determining sound signals with an intensity more than a predetermined threshold in a sound signal stream transmitted by the wearable device and detected by the first sound detection module to form a first candidate signal set;

determining sound signals with an intensity more than the predetermined threshold in the sound signal stream transmitted by the wearable device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

8. A method for switching a song, wherein the method for switching a song comprises:

generating a song switching instruction in a case that it is determined that a relative angle between a wearable device worn by a user and an intelligent device changes, wherein the relative angle is determined based on a first sound signal and a second sound signal obtained from respective detection operations performed by a first sound detection module and a second sound detection module contained in the wearable device aiming at sound signals transmitted by the intelligent device; and transmitting the song switching instruction to the intelligent device, so that the intelligent device executes a song switching operation in response to the song switching instruction;

wherein the first sound signal and the second sound signal are determined by determining sound signals with an intensity more than a predetermined threshold in a sound signal stream transmitted by the intelligent device and detected by the first sound detection module to form a first candidate signal set;

determining sound signals with an intensity more than the predetermined threshold in the sound signal stream transmitted by the intelligent device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

9. The method for switching a song according to claim 8, wherein the first sound signal and the second sound signal are ultrasonic waves in code division multiple access (CDMA) format and contain a media access control (MAC) address of the intelligent device.

10. The method for switching a song according to claim 8, wherein the generating a song switching instruction comprises at least one of:

generating an instruction for switching to a previous song of a current song in a case that the change corresponds to leftward movement of the wearable device relative to the intelligent device;

generating an instruction for switching to a next song of a current song in a case that the change corresponds to rightward movement of the wearable device relative to the intelligent device;

generating an instruction for switching to a next song of a current song in a case that the change corresponds to leftward movement of the wearable device relative to the intelligent device; and generating an instruction for switching to a previous song of a current song in a case that the change corresponds to rightward movement of the wearable device relative to the intelligent device.

11. A non-transitory computer-readable storage medium, wherein a computer-readable instruction is stored in the computer-readable storage medium, and the method for switching a song according to claim 8.

12. A wearable device, wherein the wearable device comprises:

a first sound detection module;

a second sound detection module;

a control module configured to generate a song switching instruction in a case that it is determined that a relative angle between the wearable device worn by a user and an intelligent device changes, wherein the relative angle is determined based on a first sound signal and a second sound signal obtained from respective detection operations performed by the first sound detection module and the second sound detection module contained in the wearable device aiming at sound signals transmitted by the intelligent device; and a communication module configured to transmit the song switching instruction to the intelligent device, so that the intelligent device executes a song switching operation in response to the song switching instruction;

wherein the first sound signal and the second sound signal are determined by determining sound signals with an intensity more than a predetermined threshold in a sound signal stream transmitted by the intelligent device and detected by the first sound detection module to form a first candidate signal set;

determining sound signals with an intensity more than the predetermined threshold in the sound signal stream transmitted by the intelligent device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

13. A method for switching a song, wherein the method for switching a song comprises:

generating a song switching instruction in a case that it is determined that a relative angle between an intelligent device and a wearable device worn by a user changes, wherein the relative angle is determined based on a first sound signal and a second sound signal obtained from respective detection operations performed by a first sound detection module and a second sound detection module contained in the intelligent device aiming at sound signals transmitted by the wearable device; and executing a song switching operation in the intelligent device in response to the song switching instruction;

wherein the first sound signal and the second sound signal are determined by determining sound signals with an intensity more than a predetermined threshold in a sound signal stream transmitted by the wearable device and detected by the first sound detection module to form a first candidate signal set;

determining sound signals with an intensity more than the predetermined threshold in the sound signal stream transmitted by the wearable device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

14. The method for switching a song according to claim 13, wherein the first sound signal and the second sound signal are ultrasonic waves in code division multiple access (CDMA) format and contain a media access control (MAC) address of the intelligent device.

15. The method for switching a song according to claim 13, wherein the generating a song switching instruction comprises at least one of:

generating an instruction for switching to a previous song of a current song in a case that the change corresponds to leftward movement of the wearable device relative to the intelligent device;

generating an instruction for switching to a next song of a current song in a case that the change corresponds to rightward movement of the wearable device relative to the intelligent device;

generating an instruction for switching to a next song of a current song in a case that the change corresponds to leftward movement of the wearable device relative to the intelligent device; and generating an instruction for switching to a previous song of a current song in a case that the change corresponds to rightward movement of the wearable device relative to the intelligent device.

16. An intelligent device, wherein the intelligent device comprises:

a first sound detection module;

a second sound detection module;

a control module configured to generate a song switching instruction in a case that it is determined that a relative angle between the intelligent device and a wearable device worn by a user changes, wherein the relative angle is determined based on a first sound signal and a second sound signal obtained from respective detection operations performed by a first sound detection module and a second sound detection module contained in the intelligent device aiming at sound signals transmitted by the wearable device; and a song switching module configured to execute a song switching operation in the intelligent device in response to the song switching instruction;

wherein the first sound signal and the second sound signal are determined by determining sound signals with an intensity more than a predetermined threshold in a sound signal stream transmitted by the wearable device and detected by the first sound detection module to form a first candidate signal set;

determining sound signals with an intensity more than the predetermined threshold in the sound signal stream transmitted by the wearable device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

17. A method for virtually viewing a house, wherein the method for virtually viewing a house comprises:

generating a view angle change instruction in a case that it is determined that a relative angle between a wearable device worn by a user and an intelligent device changes, wherein the relative angle is determined based on a first sound signal and a second sound signal obtained from respective detection operations performed by a first sound detection module and a second sound detection module contained in the wearable device aiming at sound signals transmitted by the intelligent device; and transmitting the view angle change instruction to the intelligent device, so that the intelligent device adjusts a view angle of a panoramic image showing a house in a display interface of the intelligent device based on the view angle change instruction;

wherein the first sound signal and the second sound signal are determined by determining sound signals with an intensity more than a predetermined threshold in a sound signal stream transmitted by the intelligent device and detected by the first sound detection module to form a first candidate signal set;

determining sound signals with an intensity more than the predetermined threshold in the sound signal stream transmitted by the intelligent device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where M=(D/c), D is a distance between the first sound detection module and the second sound detection module, and c is a propagation speed of sound.

18. The method for virtually viewing a house according to claim 17, wherein the first sound signal and the second sound signal are ultrasonic waves in code division multiple access (CDMA) format and contain a media access control (MAC) address of the intelligent device.

19. The method for virtually viewing a house according to claim 17, wherein the generating a view angle change instruction comprises at least one of:
generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to leftward movement of the wearable device relative to the intelligent device;
generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to rightward movement of the wearable device relative to the intelligent device;
generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to leftward movement of the wearable device relative to the intelligent device; and
generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to rightward movement of the wearable device relative to the intelligent device.

20. A non-transitory computer-readable storage medium, wherein a computer-readable instruction is stored in the computer-readable storage medium, and the method for virtually viewing a house according to claim 17.

21. A wearable device, wherein the wearable device comprises:
a first sound detection module;
a second sound detection module;
a control module configured to generate a view angle change instruction in a case that it is determined that a relative angle between a wearable device and an intelligent device changes, wherein the relative angle is determined based on a first sound signal and a second sound signal obtained from respective detection operations performed by the first sound detection module and the second sound detection module aiming at sound signals transmitted by the intelligent device; and
a communication module configured to transmit the view angle change instruction to the intelligent device, so that the intelligent device adjusts a view angle of a panoramic image showing a house in a display interface of the intelligent device based on the view angle change instruction;
wherein the first sound signal and the second sound signal are determined by
determining sound signals with an intensity more than a predetermined threshold in a sound signal stream transmitted by the intelligent device and detected by the first sound detection module to form a first candidate signal set;
determining sound signals with an intensity more than the predetermined threshold in the sound signal stream transmitted by the intelligent device and detected by the second sound detection module to form a second candidate signal set;
determining a time difference between a receiving time of each sound signal in the first candidate signal set and a receiving time of each sound signal in the second candidate signal set; and
determining a pair of sound signals with a time difference less than M as the first sound signal and the second sound signal, where M=(D/c), D is a distance between the first sound detection module and the second sound detection module, and c is a propagation speed of sound.

22. A method for virtually viewing a house, wherein the method for virtually viewing a house comprises:
generating a view angle change instruction in a case that it is determined that a relative angle between an intelligent device and a wearable device worn by a user changes, wherein the relative angle is determined based on a first sound signal and a second sound signal obtained from respective detection operations performed by a first sound detection module and a second sound detection module contained in the intelligent device aiming at sound signals transmitted by the wearable device; and
adjusting a view angle of a panoramic image showing a house in a display interface of the intelligent device based on the view angle change instruction;
wherein the first sound signal and the second sound signal are determined by
determining sound signals with an intensity more than a predetermined threshold in a sound signal stream transmitted by the wearable device and detected by the first sound detection module to form a first candidate signal set;
determining sound signals with an intensity more than the predetermined threshold in the sound signal stream transmitted by the wearable device and detected by the second sound detection module to form a second candidate signal set;
determining a time difference between a receiving time of each sound signal in the first candidate signal set and a receiving time of each sound signal in the second candidate signal set; and
determining a pair of sound signals with a time difference less than M as the first sound signal and the second sound signal, where M=(D/c), D is a distance between the first sound detection module and the second sound detection module, and c is a propagation speed of sound.

23. The method for virtually viewing a house according to claim 22, wherein the first sound signal and the second sound signal are ultrasonic waves in code division multiple access (CDMA) format and contain a media access control (MAC) address of the intelligent device.

24. The method for virtually viewing a house according to claim 22, wherein the generating a view angle change instruction comprises at least one of:
generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to leftward movement of the wearable device relative to the intelligent device;

generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to rightward movement of the wearable device relative to the intelligent device;

generating an instruction for rightwards moving the view angle of the panoramic image by a fixed angle or rightwards moving an angle related to a change amount of the change, or generating an instruction for rightwards moving to a predetermined point in the panoramic image in a case that the change corresponds to leftward movement of the wearable device relative to the intelligent device; and generating an instruction for leftwards moving the view angle of the panoramic image by a fixed angle or leftwards moving an angle related to a change amount of the change, or generating an instruction for leftwards moving to a predetermined point in the panoramic image in a case that the change corresponds to rightward movement of the wearable device relative to the intelligent device.

25. An intelligent device, wherein the intelligent device comprises:
- a first sound detection module;
- a second sound detection module;
- a control module configured to generate a view angle change instruction in a case that it is determined that a relative angle between an intelligent device and a wearable device worn by a user changes, wherein the relative angle is determined based on a first sound signal and a second sound signal obtained from respective detection operations performed by a first sound detection module and a second sound detection module contained in the intelligent device aiming at sound signals transmitted by the wearable device; and
- a view angle adjustment module configured to adjust a view angle of a panoramic image showing a house in a display interface of the intelligent device based on the view angle change instruction;

wherein the first sound signal and the second sound signal are determined by determining sound signals with an intensity more than a predetermined threshold in a sound signal stream transmitted by the wearable device and detected by the first sound detection module to form a first candidate signal set;

determining sound signals with an intensity more than the predetermined threshold in the sound signal stream transmitted by the wearable device and detected by the second sound detection module to form a second candidate signal set;

determining a time difference between a receiving time of each sound signal in the first candidate signal set and a receiving time of each sound signal in the second candidate signal set; and determining a pair of sound signals with a time difference less than M as the first sound signal and the second sound signal, where $M=(D/c)$, D is a distance between the first sound detection module and the second sound detection module, and c is a propagation speed of sound.

* * * * *